United States Patent
Tahara et al.

(10) Patent No.: US 11,482,379 B2
(45) Date of Patent: Oct. 25, 2022

(54) CERAMIC ELECTRONIC COMPONENT AND MANUFACTURING METHOD OF THE SAME

(71) Applicant: TAIYO YUDEN CO., LTD., Tokyo (JP)

(72) Inventors: Mikio Tahara, Tokyo (JP); Tomoaki Nakamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 83 days.

(21) Appl. No.: 17/089,559

(22) Filed: Nov. 4, 2020

(65) Prior Publication Data
US 2021/0151255 A1 May 20, 2021

(30) Foreign Application Priority Data
Nov. 18, 2019 (JP) .............................. JP2019-208102

(51) Int. Cl.
*H01G 4/248* (2006.01)
*H01G 4/30* (2006.01)
*H01G 4/12* (2006.01)
*H01G 4/012* (2006.01)
*H01G 13/00* (2013.01)
*H01G 4/232* (2006.01)

(52) U.S. Cl.
CPC .............. *H01G 4/248* (2013.01); *H01G 4/012* (2013.01); *H01G 4/12* (2013.01); *H01G 4/232* (2013.01); *H01G 4/30* (2013.01); *H01G 13/00* (2013.01)

(58) Field of Classification Search
CPC ............ H01G 4/30; H01G 4/12; H01G 4/012; H01G 4/232; H01G 4/248; H01G 13/00

USPC ............. 361/301.4, 321.3, 306.3, 309, 321.1
See application file for complete search history.

(56) References Cited

U.S. PATENT DOCUMENTS

| | | | | |
|---|---|---|---|---|
| 2008/0310076 A1* | 12/2008 | Ritter | ..................... | H01G 4/232 361/306.3 |
| 2010/0085682 A1* | 4/2010 | Abe | ....................... | H01G 4/232 29/829 |
| 2011/0141655 A1* | 6/2011 | Jeong | ..................... | H01G 4/005 361/306.3 |

(Continued)

FOREIGN PATENT DOCUMENTS

| JP | 2013-012561 A | 1/2013 |
|---|---|---|
| JP | 2013-026392 A | 2/2013 |

(Continued)

*Primary Examiner* — Arun Ramaswamy
(74) *Attorney, Agent, or Firm* — Stein IP, LLC

(57) ABSTRACT

A ceramic electronic component includes a multilayer chip including a multilayer structure and cover layers disposed on top and bottom faces in a stack direction of the multilayer structure, and a pair of external electrodes respectively formed on two edge faces of the multilayer structure and extending to four side faces of the multilayer chip, wherein each external electrode has a recessed portion on at least one of two side faces facing each other in the stack direction or at least one of remaining two side faces, and wherein each external electrode has no recessed portion on the two side faces when each external electrode has the recessed portion on at least one of the remaining two side faces, and has no recessed portion on the remaining two side faces when each external electrode has the recessed portion on at least one of the two side faces.

10 Claims, 18 Drawing Sheets

(56) References Cited

U.S. PATENT DOCUMENTS

| | | | | |
|---|---|---|---|---|
| 2012/0018204 | A1* | 1/2012 | Sato | H01G 4/232 |
| | | | | 361/321.1 |
| 2013/0020913 | A1 | 1/2013 | Shirakawa et al. | 310/364 |
| 2014/0311783 | A1* | 10/2014 | Lee | H01G 4/30 |
| | | | | 361/321.2 |
| 2015/0041194 | A1* | 2/2015 | Shim | H01G 4/232 |
| | | | | 361/301.4 |
| 2017/0154731 | A1* | 6/2017 | Tahara | H01G 4/232 |
| 2018/0182537 | A1 | 6/2018 | Shimizu et al. | H01F 27/29 |
| 2018/0332715 | A1* | 11/2018 | Woo | H05K 3/3442 |
| 2020/0066448 | A1* | 2/2020 | Sasaki | H01G 4/224 |

FOREIGN PATENT DOCUMENTS

| | | |
|---|---|---|
| JP | 2014-086606 A | 5/2014 |
| JP | 2016-219624 A | 12/2016 |
| JP | 2017-103321 A | 6/2017 |
| JP | 2018-107346 A | 7/2018 |

\* cited by examiner

CERAMIC ELECTRONIC COMPONENT AND MANUFACTURING METHOD OF THE SAME

CROSS-REFERENCE TO RELATED APPLICATION

This application is based upon and claims the benefit of priority of the prior Japanese Patent Application No. 2019-208102, filed on Nov. 18, 2019, the entire contents of which are incorporated herein by reference.

FIELD

A certain aspect of the present disclosure relates to a ceramic electronic component and a manufacturing method of the same.

BACKGROUND

To reduce the mounting space of electronic components such as multilayer ceramic capacitors on circuit boards in response to downsizing and technical advancement in performance of the electronic devices, it is suggested to control the shape of a solder fillet formed by wetting-up of solder to the edge face of the external electrode as disclosed in, for example, Japanese Patent Application Publication Nos. 2013-026392 and 2017-103321 (hereinafter, referred to as Patent Documents 1 and 2, respectively). It is also suggested to reduce the land pattern as disclosed in, for example, Japanese Patent Application Publication Nos. 2014-086606 and 2016-219624 (hereinafter, referred to as Patent Documents 3 and 4, respectively).

SUMMARY OF THE INVENTION

In the techniques disclosed in Patent Documents 1 to 4, the bonding area of solder with the multilayer ceramic capacitor and the circuit board is small. Thus, the bond strength between the multilayer ceramic capacitor and the circuit board may decrease.

As a countermeasure against the above, for example, as disclosed in Japanese Patent Application Publication No. 2013-012561 (hereinafter, referred to as Patent Document 5), recessed portions may be formed on the peripheral surfaces of the external electrode to increase the amount of solder existing between the multilayer ceramic capacitor and the circuit board, thereby increasing the bond strength between the multilayer ceramic capacitor and the circuit board.

In Patent Document 5, the recessed portions are formed on the peripheral surfaces of the external electrode by adjusting the amount of the binder in the conductive paste for forming the external electrode. However, in this case, it is difficult to stably form a recessed portion having a predetermined depth, and there may be a case that sufficient bond strength is not achieved in some finished products.

The present invention has an objective to provide a ceramic electronic component and a manufacturing method of the same that are capable of ensuring the bond strength between the ceramic electronic component and a circuit board.

According to a first aspect of the embodiments, there is provided a ceramic electronic component including: a multilayer chip having a substantially rectangular parallelepiped shape and including a multilayer structure and cover layers disposed on a top face and a bottom face in a stack direction of the multilayer structure, the multilayer structure including dielectric layers and internal electrode layers that are alternately stacked, the dielectric layers being mainly composed of ceramic, the internal electrode layers being alternately exposed to two edge faces of the multilayer structure facing each other; and a pair of external electrodes respectively formed on the two edge faces, each external electrode extending to four side faces of the multilayer chip, wherein each external electrode has a recessed portion on at least one of two side faces facing each other in the stack direction or at least one of remaining two side faces, and wherein each external electrode has no recessed portion on the two side faces when each external electrode has the recessed portion on at least one of the remaining two side faces, and has no recessed portion on the remaining two side faces when each external electrode has the recessed portion on at least one of the two side faces.

According to a second aspect of the embodiments, there is provided a manufacturing method of a ceramic electronic component including: alternately stacking dielectric green sheets for ceramic dielectric layers and conductive pastes for internal electrode layers so that the internal electrode layers are alternately exposed to two edge faces facing each other and disposing a cover sheet on an uppermost layer and another cover sheet on a lowermost layer so as to form a ceramic multilayer structure having a substantially rectangular parallelepiped shape; forming a recessed portion in the metal paste on at least one of two side faces facing each other in a first direction perpendicular to a second direction and a third direction, and forming no recessed portion in the metal paste on remaining two side faces facing each other in the second direction, the second direction being a stack direction of the ceramic multilayer structure, the third direction being a facing direction of the two edge faces; and firing the metal paste and the ceramic multilayer structure simultaneously.

According to a third aspect of the embodiments, there is provided a manufacturing method of a ceramic electronic component including: alternately stacking dielectric green sheets for ceramic dielectric layers and conductive pastes for internal electrode layers to form a multilayer structure; disposing cover sheets respectively on a top face and a bottom face in a stack direction of the multilayer structure; forming two edge faces to which the internal electrode layers are alternately exposed and two side faces to which the internal electrode layers are all exposed by cutting the multilayer structure; disposing a side margin sheet on each of the two side faces to which all the internal electrode layers are exposed to form a ceramic multilayer structure having a substantially rectangular parallelepiped shape, the conductive pastes for internal electrode layers being alternately exposed to two edge faces facing each other of the ceramic multilayer structure; applying a metal paste on each of the two edge faces of the ceramic multilayer structure in a manner such that the metal past extends to four side faces of the ceramic multilayer structure; forming a recessed portion in the metal paste on at least one of two side faces facing each other in the stack direction and forming no recessed portion in the metal paste on side faces other than the two side faces facing each other in the stack direction among the four side faces; and firing the metal paste and the ceramic multilayer structure simultaneously.

DETAILED DESCRIPTION

Hereinafter, embodiments will be described with reference to the accompanying drawings.

First Embodiment

Figure 1:
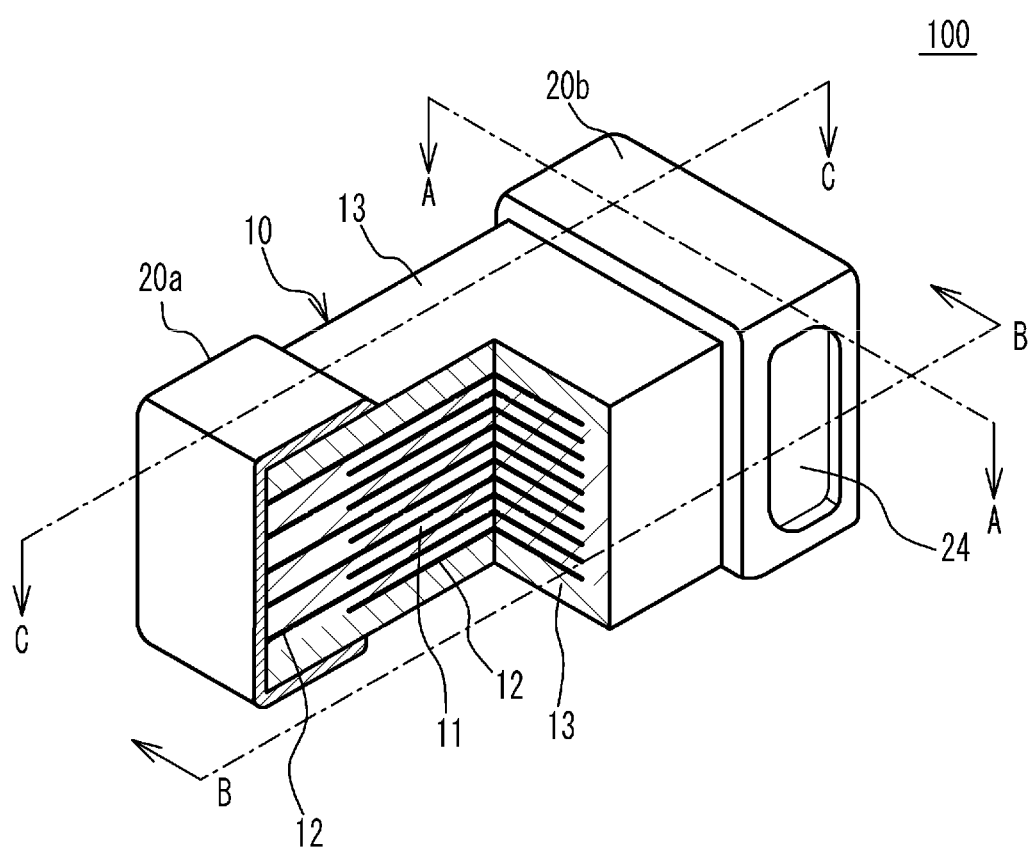
FIG. 1 is a partial cross-sectional perspective view of a multilayer ceramic capacitor in accordance with a first embodiment.

First, a multilayer ceramic capacitor will be described. FIG. 1 is a partial cross-sectional perspective view of a multilayer ceramic capacitor 100 in accordance with a first embodiment. As illustrated in FIG. 1, the multilayer ceramic capacitor 100 includes a multilayer chip 10 having a rectangular parallelepiped shape, and external electrodes 20a and 20b respectively provided on two edge faces of the multilayer chip 10 facing each other. The four faces other than the two edge faces of the multilayer chip 10 will be referred to as side faces. The external electrodes 20a and 20b extend to four side faces. However, the external electrodes 20a and 20b are spaced from each other on each of the four side faces.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. In the multilayer chip 10, among the four side faces, two side faces corresponding to the top face and the bottom face in the direction in which the dielectric layers 11 and the internal electrode layer 12 are stacked (hereinafter, referred to as a stack direction) are formed of cover layers 13. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The dielectric layer 11 is mainly composed of a ceramic material having a perovskite structure expressed by a general formula $ABO_3$. The perovskite structure includes $ABO_{3-\alpha}$ having an off-stoichiometric composition. Examples of such a ceramic material include, but are not limited to, barium titanate ($BaTiO_3$), calcium zirconate ($CaZrO_3$), calcium titanate ($CaTiO_3$), strontium titanate ($SrTiO_3$), and $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. The average thickness of the dielectric layer 11 is, for example, 1 μm or less.

The internal electrode layer 12 is mainly composed of a base metal such as nickel (Ni), copper (Cu), or tin (Sn). The internal electrode layer 12 may be mainly composed of a noble metal such as platinum (Pt), palladium (Pd), silver (Ag), or gold (Au) or an alloy including one or more of them. The average thickness of the internal electrode layer 12 is, for example, 1 μm or less.

Figure 2A:
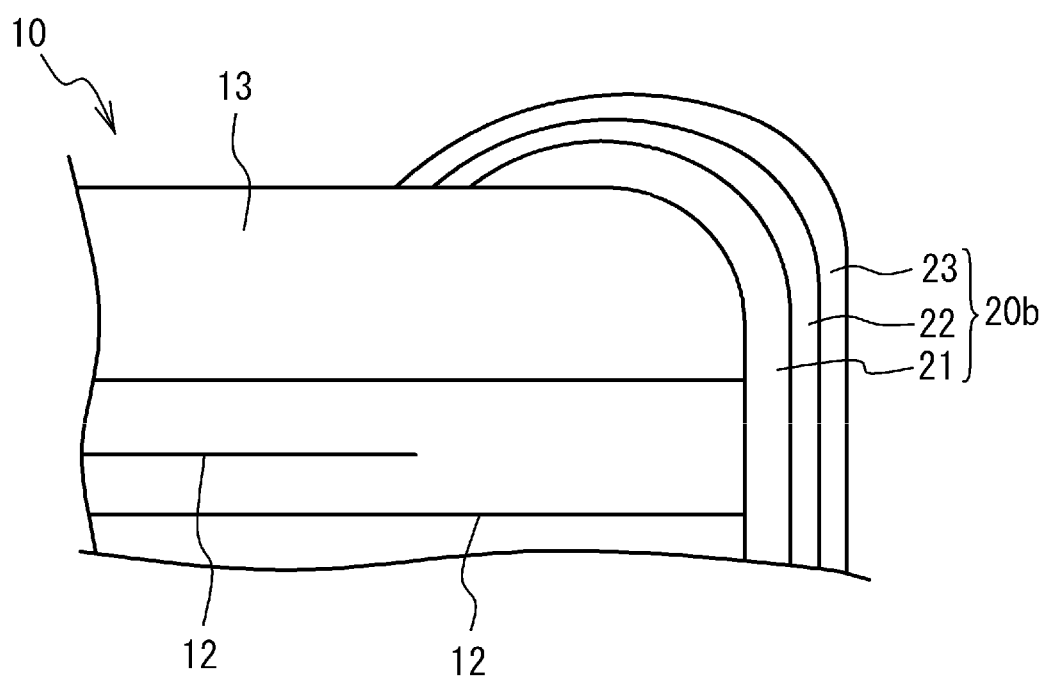
FIG. 2A is a partial cross-sectional view taken along line C-C in FIG. 1.

FIG. 2A is a cross-sectional view of the external electrode 20b, and is a partial cross-sectional view taken along line C-C in in FIG. 1. A ceramic material is mainly exposed on the surfaces of the multilayer chip 10. Thus, it is difficult to form a plated layer on the surface of the multilayer chip 10 without a base layer. Thus, as illustrated in FIG. 2A, the external electrode 20b has a structure designed to have a plated layer formed on a base conductive layer 21 formed on the surface of the multilayer chip 10. The plated layer includes a first plated layer 22 that is in contact with the base conductive layer 21 and covers the base conductive layer 21, and a second plated layer 23 that is in contact with the first plated layer 22 and covers the first plated layer 22. A base plated layer may be interposed between the base conductive layer 21 and the first plated layer 22. The base conductive layer 21 is mainly composed of a metal such as Cu, Ni, aluminum (Al), zinc (Zn), Ag, Au, Pd, or Pt, or an alloy of two or more of them (e.g., an alloy of Cu and Ni), and contains a glass component for densifying the base conductive layer 21 and ceramic such as a co-material for controlling the sinterability of the base conductive layer 21. The glass component is an oxide of barium (Ba), strontium (Sr), calcium (Ca), Zn, Al, silicon (Si), or boron (B). The co-material is a ceramic component mainly composed of the same material as, for example, the main component of the dielectric layer 11. The plated layer is mainly composed of a metal such as Cu, Ni, Al, Zn, or Sn or an alloy of two or more of them.

Figure 2B:
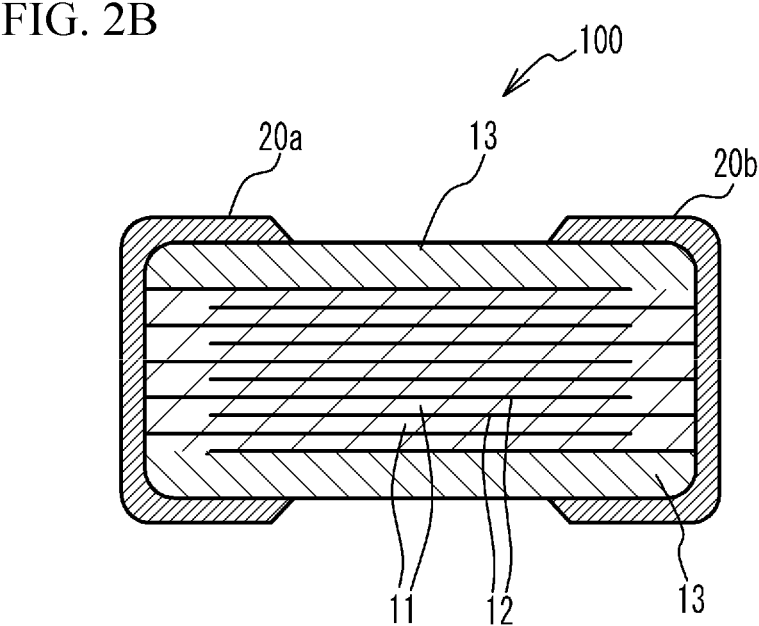
FIG. 2B is a cross-sectional view taken along line C-C in FIG. 1.
Figure 3A:
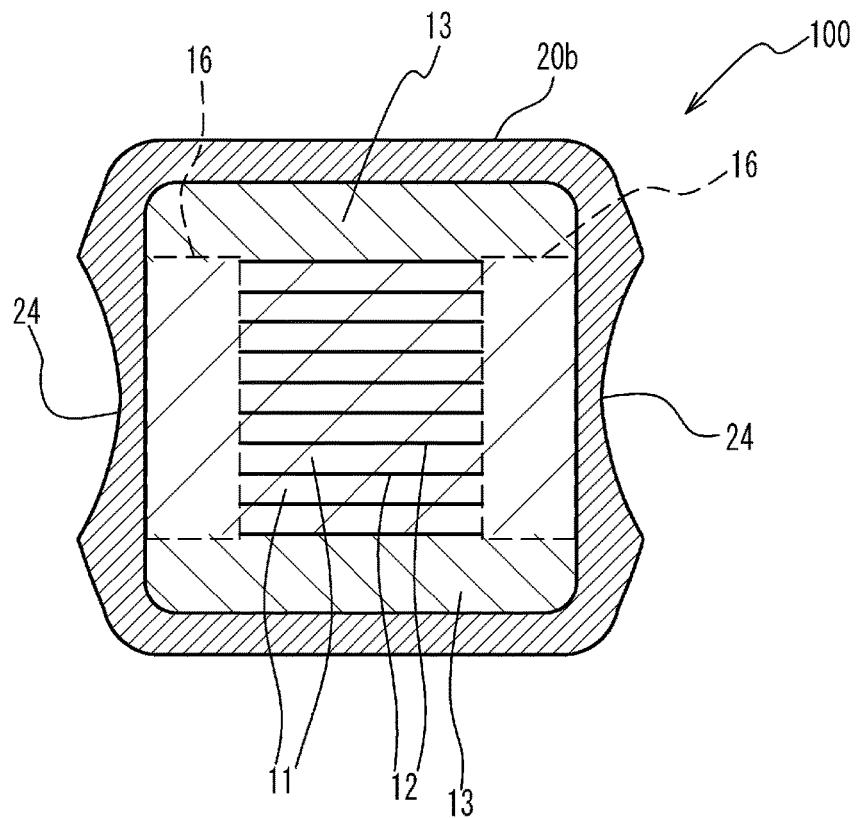
FIG. 3A is a cross-sectional view taken along line A-A in FIG. 1.
Figure 3B:
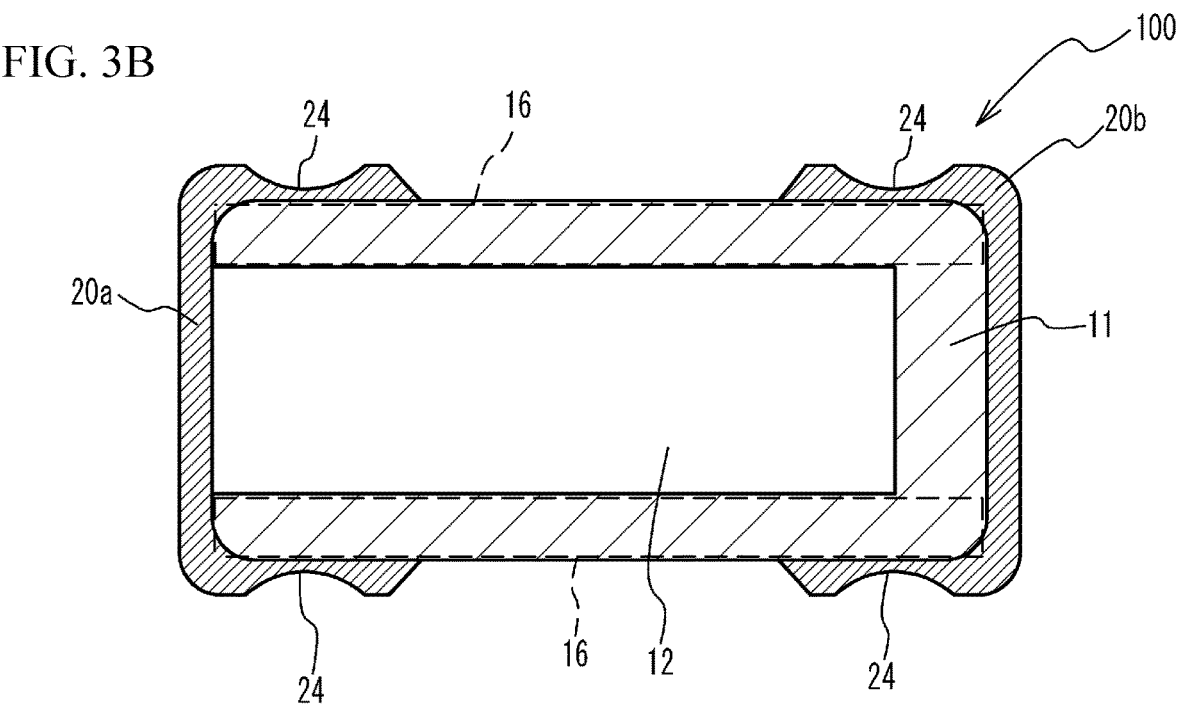
FIG. 3B is a cross-sectional view taken along line B-B in FIG. 1.

FIG. 2B is a cross-sectional view taken along line C-C in FIG. 1, FIG. 3A is a cross-sectional view taken along line A-A in FIG. 1, and FIG. 3B is a cross-sectional view taken along line B-B in FIG. 1. As illustrated in FIG. 3A, in the multilayer chip 10, the portion from each of the two side faces of the multilayer chip 10 to the internal electrode layers 12 is referred to as a side margin portion 16. That is, the side margin portions 16 are portions that cover the edges of the stacked internal electrode layers 12 extending toward the respective side faces of the multilayer chip 10 in the multilayer structure in which the dielectric layers 11 and the internal electrode layers 12 are stacked.

Figure 4:
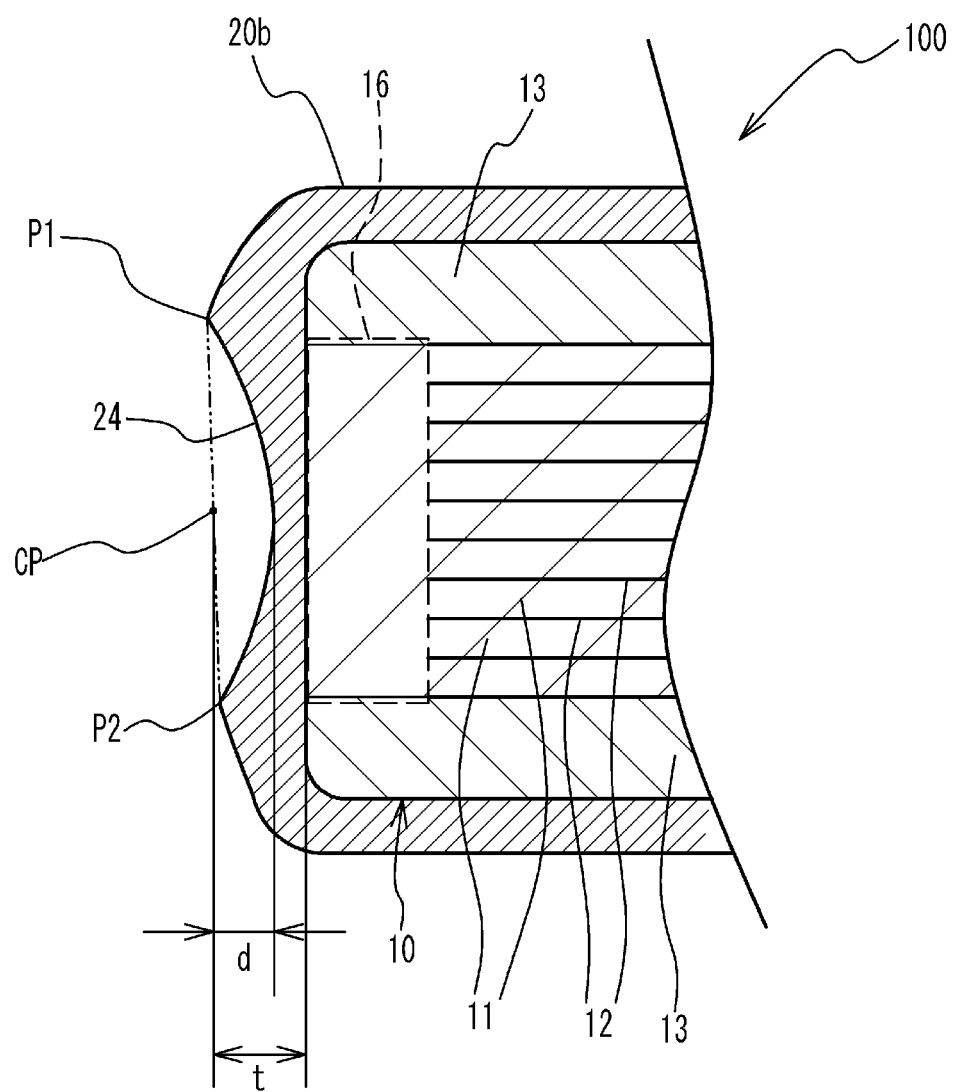
FIG. 4 is a diagram for describing a recess level X.

As illustrated in FIG. 1, FIG. 2B, FIG. 3A, and FIG. 3B, each of the external electrodes 20a and 20b has a recessed portion 24 on at least one of two side faces other than two side faces (the top face and the bottom face) facing each other in the stack direction of the multilayer chip 10, and has no recessed portion 24 on the two side faces (the top face and the bottom face) facing each other in the stack direction. Here, no recessed portion 24 means that the recess level X is less than 25%. The recess level X is the ratio of the depth d of the recessed portion 24 to the thickness t of each of the external electrodes 20a and 20b, i.e., the recess level X= (d/t)×100 [%]. The thickness t of each of the external electrodes 20a and 20b is a distance between the center CP of the straight line connecting the point P1 with the point P2 and the side face, on which the external electrode 20a, 20b has the recessed portion 24, of the multilayer chip 10 as illustrated in FIG. 4. The point P1 is the point farthest from the side face, on which the external electrode 20a, 20b has the recessed portion 24, of the multilayer chip 10 in the outer edge of the recessed portion 24. The point P2 is the point closest to the side face, on which the external electrode 20a, 20b has the recessed portion 24, of the multilayer chip 10 in the outer edge of the recessed portion 24. The depth d of the recessed portion 24 is a distance between the center CP and the point at which the recessed portion 24 is deepest (the point at which the external electrode 20a, 20b is thinnest). Since the recessed portion 24 is formed in the external electrode 20a, 20b on the side face formed of the side margin portion 16 and the cover layer 13 that are made of materials having different properties (for example, different densities), the recessed portion 24 can have a desired recess level X. The side faces in the stack direction of the multilayer chip 10 (the top face and the bottom face in the stack direction) are formed of the respective cover layers 13 having a uniform property. Thus, it is difficult to form the recessed portion 24 having a desired recess level X.

Figure 5:
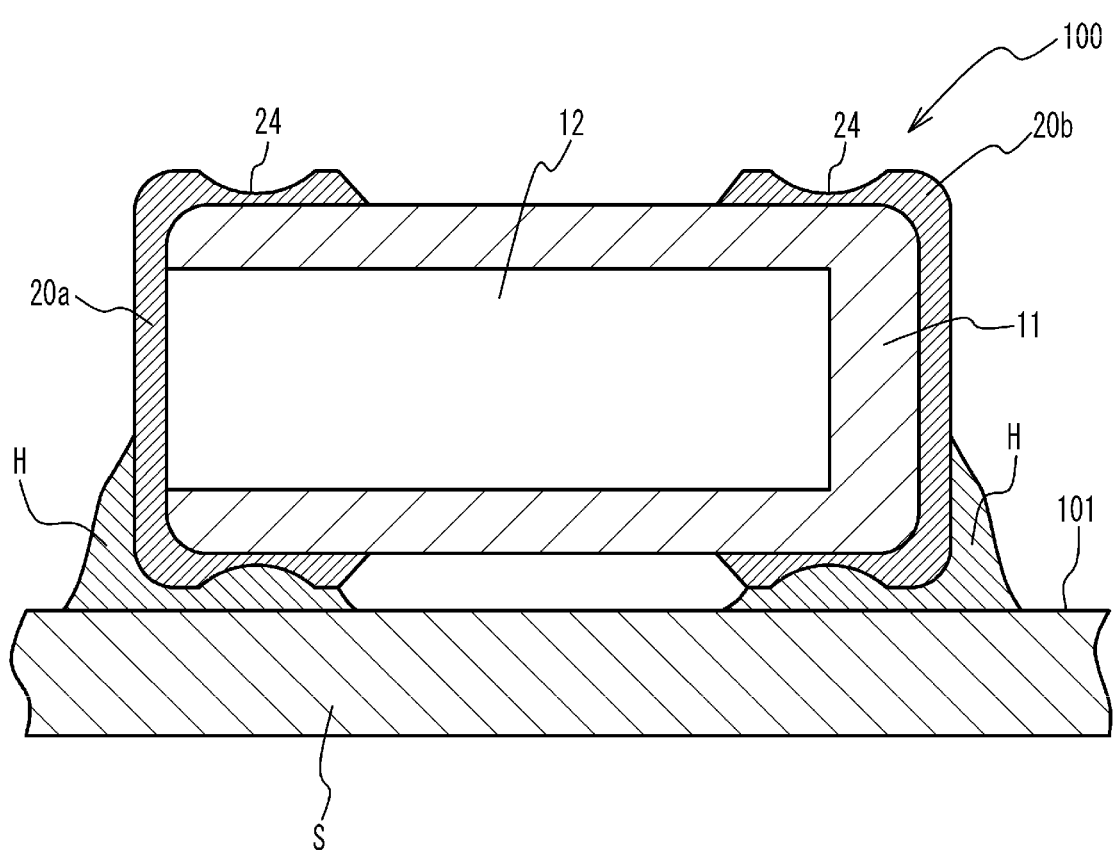
FIG. 5 illustrates a state where the multilayer ceramic capacitor of the first embodiment is mounted on the mounting face of a substrate.

In the multilayer ceramic capacitor 100 in accordance with the first embodiment, each of a pair of the external electrodes 20a and 20b formed from the respective edge faces to the four side faces of the multilayer chip 10 has the recessed portion 24 on at least one of the two side faces facing each other in the stack direction or at least one of the remaining two side faces (in the first embodiment, each external electrode 20a, 20b has the recessed portion 24 on at least one of the remaining two side faces), and has no recessed portion 24 on the two side faces when each external electrode 20a, 20b has the recessed portion 24 on at least one of the remaining two side faces, and has no recessed portion 24 on the remaining two side faces when each external electrode 20a, 20b has the recessed portion 24 on at least one of the two side faces (in the first embodiment, each external electrode 20a, 20b has no recessed portion 24 on the two side faces facing each other in the stack direction). As illustrated in FIG. 5, the multilayer ceramic capacitor 100 is soldered (mounted) to a mounting surface 101 of a circuit board S with the recessed portion 24 facing the circuit board S. Presence of the recessed portion 24 makes the amount of solder H existing between the multilayer ceramic capacitor 100 and the circuit board S larger than that in the case where no recessed portion 24 is present. Thus, the bond strength between the multilayer ceramic capacitor 100 and the circuit board S is ensured.

As the recess level X decreases, the depth d of the recessed portion 24 decreases, and the amount of solder H between the multilayer ceramic capacitor 100 and the circuit board thus decreases when the multilayer ceramic capacitor 100 is mounted to the circuit board. As a result, it may be impossible to ensure a predetermined bond strength. Thus, the recess level X is preferably 25% or greater. On the other hand, when the recess level X is excessively large, the thicknesses of the external electrodes 20a and 20b may become insufficient, resulting in exposure of the multilayer chip or decrease in reliability. Thus, the recess level X is preferably 75% or less.

The external electrodes 20a and 20b of the multilayer ceramic capacitor 100 may have recessed portions on the respective edge faces as long as the thickness of each of the external electrodes 20a and 20b at the thinnest part is a predetermined value or greater.

Figure 6:
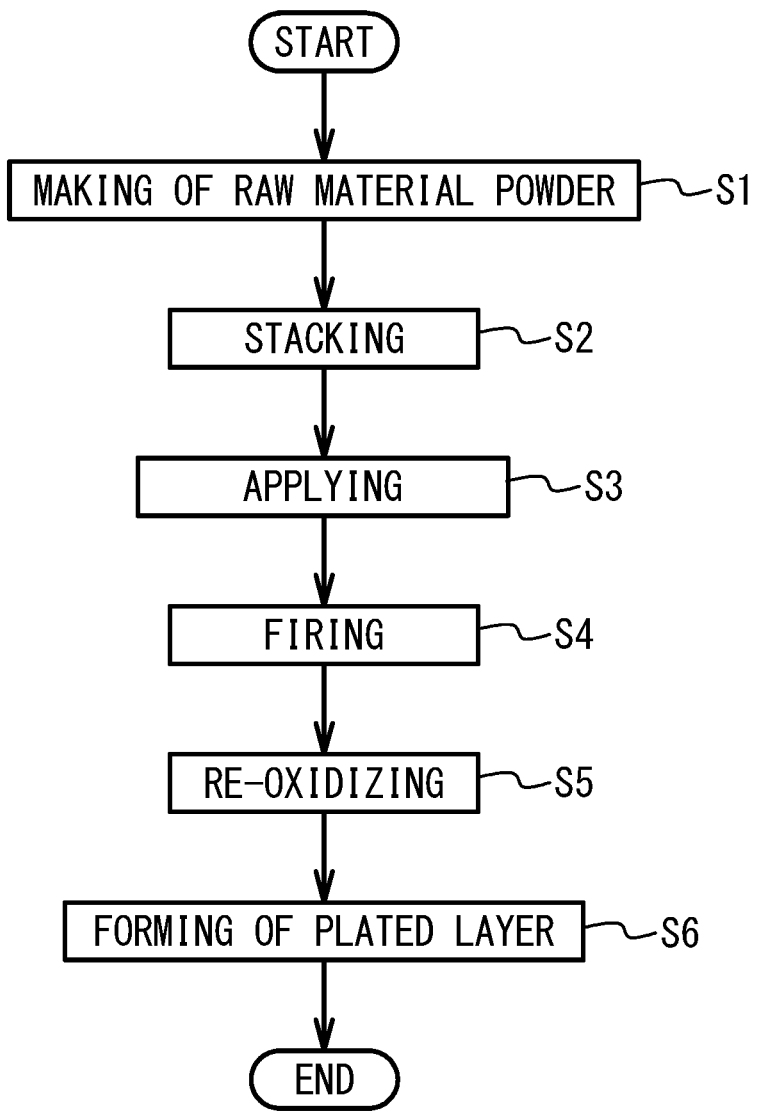
FIG. 6 is a flowchart of a manufacturing method of the multilayer ceramic capacitor in accordance with the first embodiment.

Next, a manufacturing method of the multilayer ceramic capacitor 100 in accordance with the first embodiment will be described. FIG. 6 is a flowchart of the manufacturing method of the multilayer ceramic capacitor 100 of the first embodiment.

[Making of Raw Material Powder (S1)]

Additive compound is added to powder of a ceramic material that is a main component of the dielectric layer 11, in accordance with purposes. The additive compound may be an oxide of magnesium (Mg), manganese (Mn), vanadium (V), chromium (Cr) or a rare earth element (yttrium (Y), samarium (Sm), europium (Eu), gadolinium (Gd), terbium (Tb), dysprosium (Dy), holmium (Ho), erbium (Er), thulium (Tm), or ytterbium (Yb)), or an oxide of cobalt (Co), Ni, lithium (Li), B, sodium (Na), potassium (K) or Si, or glass containing Co, Ni, Li, B, Na, K, or Si. For example, compound including additive compound is added to ceramic material powder and is calcined. Next, the resulting ceramic material particles are wet-blended with additive compound, are dried, and are crushed. Through this process, the ceramic material powder is prepared.

[Stacking Process (S2)]

Next, a binder such as polyvinyl butyral (PVB) resin, an organic solvent such as ethanol or toluene, and a plasticizer are added to the resulting ceramic material powder and wet-blended. With use of the resulting slurry, a strip-shaped dielectric green sheet with a thickness of 1.0 μm or less is coated on a base material using, for example, a die coater method or a doctor blade method, and then dried.

Then, a pattern of the internal electrode layer 12 is disposed on the surface of the dielectric green sheet by printing a conductive paste for forming the internal electrode layer by screen printing or gravure printing. The conductive paste for forming the internal electrode layer includes the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be dispersed in the conductive paste for forming the internal electrode layer.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked green sheets and under the stacked green sheets. The resulting compact is cut into a predetermined size (for example, 1.0 mm×0.5 mm). In this case, used is the cover sheet having a density less than the density of the dielectric green sheet that is to form the side margin portion 16. Through the above processes, a ceramic multilayer structure having a substantially rectangular parallelepiped shape is obtained.

[Application Process (S3)]

Figure 7A:
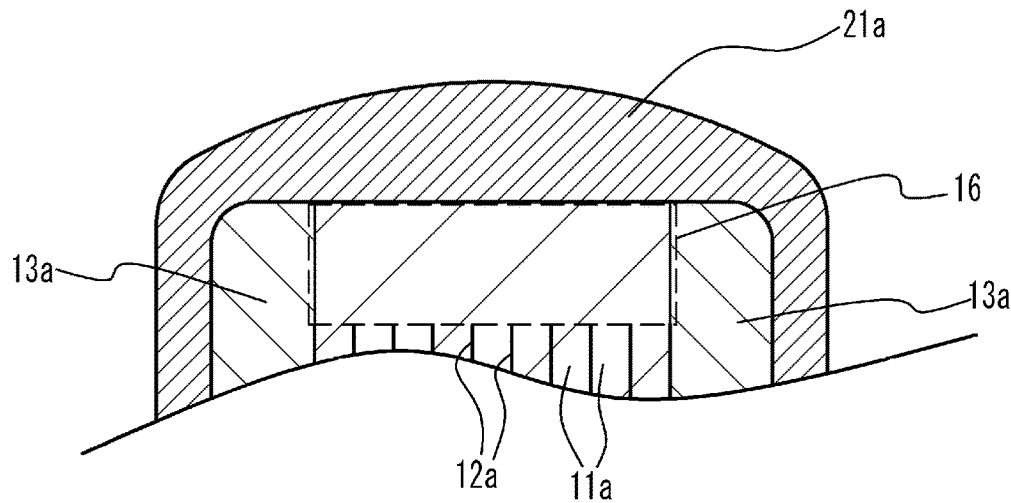
FIG. 7A to FIG. 7C are diagrams for describing how a recessed portion is formed.

A binder is removed from the resulting ceramic multilayer structure in a $N_2$ atmosphere in a temperature range of 250° C. to 500° C. Then, as illustrated in FIG. 7A, a metal paste 21a, which is to be the base conductive layer 21 of each of the external electrodes 20a and 20b, is applied to the ceramic multilayer structure by dipping or the like so that the metal paste 21a extends from each of both edge faces to the four side faces.

Figure 7B:
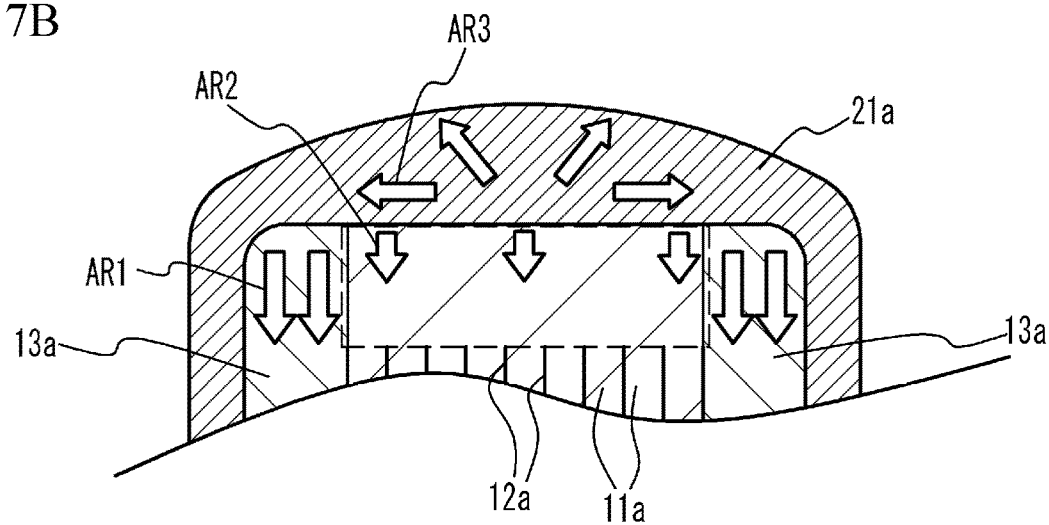
Figure 7C:
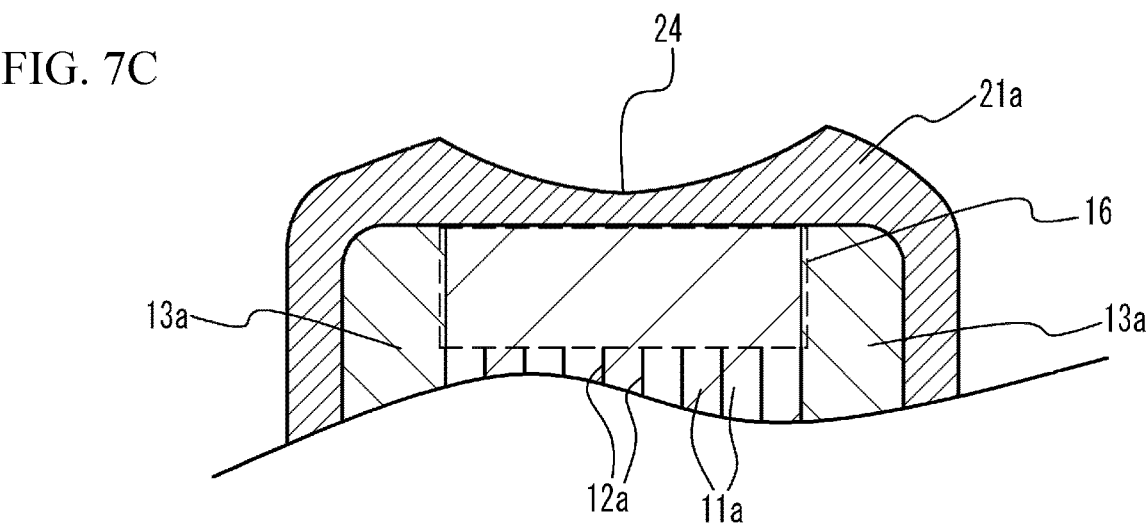

As described above, the density of a cover sheet 13a, which is to be the cover layer 13, is less than the density of a dielectric green sheet 11a, which is to form the side margin portion 16. Thus, as illustrated in FIG. 7B, the moisture in the metal paste 21a penetrates the cover sheet 13a at a faster penetration rate (see arrows AR1) than the penetration rate at which the moisture in the metal paste 21a penetrates the side margin portion 16 (see arrows AR2). As a result, the metal paste 21a on the cover sheet 13a (the outer metal paste 21a) starts to dry earlier than the metal paste 21a on the dielectric green sheet 11a, and is contracted. This causes the metal paste 21a of the center portion that is not yet dried is pulled outward (toward the cover sheet 13a side) as indicated by arrows AR3. Thus, the concentration of the solvent at the edge portion of the metal paste 21a that is not yet dried decreases, and the surface tension increases. This causes the edge portion of the metal paste 21a that is not yet dried to become thick because of the mass transfer from the center portion, causing the center portion to yield as illustrated in FIG. 7C. As a result, the recessed portion 24 is formed. As described above, since materials having different properties can be used for the cover sheet 13a and the dielectric green sheet 11a, the recessed portion 24 having a desired recess level X can be formed in the external electrodes 20a and 20b on the side faces formed of the cover sheets 13a and the dielectric green sheets 11a using the difference in properties between the cover sheet 13a and the dielectric green sheet 11a. On the other hand, the top face and the bottom face in the stack direction of the ceramic multilayer structure are formed of the cover sheets 13a. Thus, it is impossible to form the recessed portion 24 using the difference in properties. Therefore it is difficult to form the recessed portion 24 having a desired recess level X in the external electrodes 20a and 20b on the top face and the bottom face.

[Firing Process (S4)]

Thereafter, the metal pastes and the ceramic multilayer structure are fired in a reducing atmosphere including, for example, approximately 1.5 volume % of $H_2$ in a temperature range of approximately 900° C. to 1050° C. for approximately two hours. Thus, firing of the dielectric layers 11 and the internal electrode layers 12 and baking of the base conductive layers 21 are performed simultaneously, and a half-finished product of the multilayer ceramic capacitor 100 can be obtained.

[Re-oxidizing Process (S5)]

Thereafter, the resulting half-finished product may be subjected to a re-oxidizing process in an $N_2$ gas atmosphere in a temperature range of 600° C. to 1000° C.

[Forming Process of Plated Layer (S6)]

Then, the first plated layer 22 is formed on the base conductive layer 21 of the half-finished product by electrolytic plating. In addition, the second plated layer 23 is formed on the first plated layer 22 by electrolytic plating.

As described above, the manufacturing method of the multilayer ceramic capacitor 100 in accordance with the first embodiment illustrated in FIG. 6 enables to manufacture the multilayer ceramic capacitor 100 in which each of the external electrodes 20a and 20b formed from the respective edge faces to the four side faces of the multilayer chip 10 has the recessed portion 24 on at least one of the two side faces other than the two side faces facing each other in the stack direction of the multilayer chip 10 and has no recessed portion 24 on the two side faces facing each other in the stack direction of the multilayer chip 10. The multilayer ceramic capacitor 100 is soldered (mounted) to the mounting surface of a circuit board with the recessed portion 24 facing the circuit board. Presence of the recessed portion 24 makes the amount of solder existing between the multilayer ceramic capacitor 100 and the circuit board larger than that in the case where no recessed portion 24 is present. Thus, the bond strength between the multilayer ceramic capacitor 100 and the circuit board is ensured. The term "no recessed portion 24 is formed in the metal paste on the side faces other than the two side faces facing each other among the four side faces of the ceramic multilayer structure" means that the recessed portion 24 having a recess level X of 25% or greater is not formed.

In the first embodiment, the density of the cover sheet 13a is less than the density of the dielectric green sheet 11a. This configuration allows the recessed portion 24 having a depth sufficient to ensure the predetermined bond strength to be formed more stably than in the case where the recessed portion 24 is formed by using the same material for the cover sheet 13a and the dielectric green sheet 11a and adjusting the amount of the binder in the conductive paste for forming the base conductive layer. Therefore the bond strength between the multilayer ceramic capacitor 100 and the circuit board can be ensured.

Second Embodiment

Figure 8:
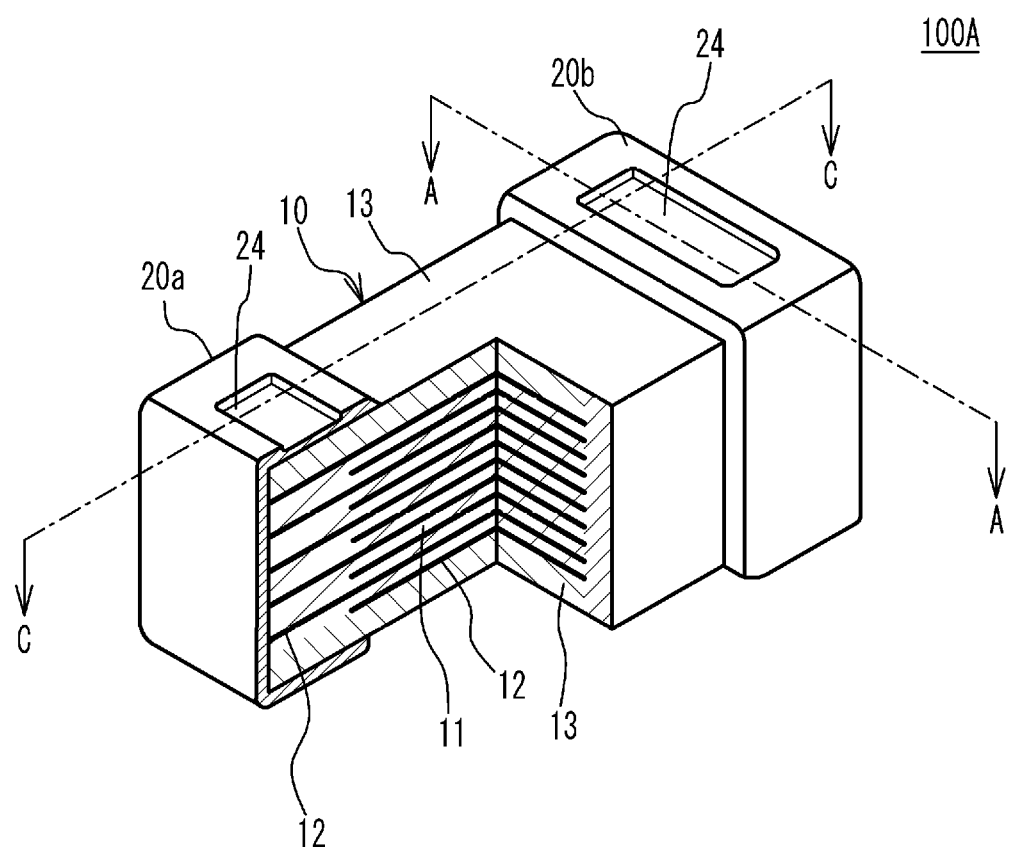
FIG. 8 is a partial cross-sectional perspective view of a multilayer ceramic capacitor in accordance with a second embodiment.
Figure 9A:
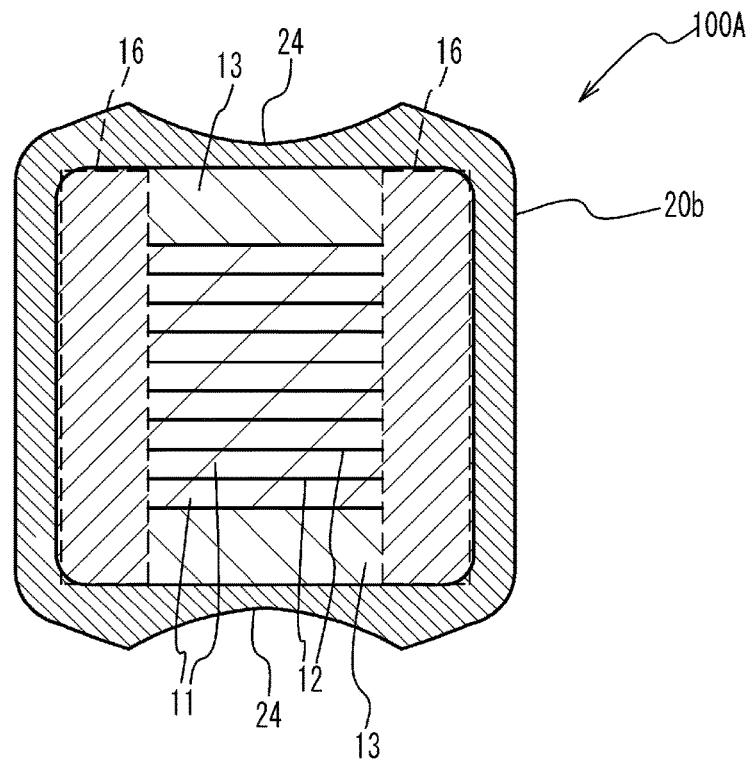
FIG. 9A is a cross-sectional view taken along line A-A in FIG. 8.
Figure 9B:
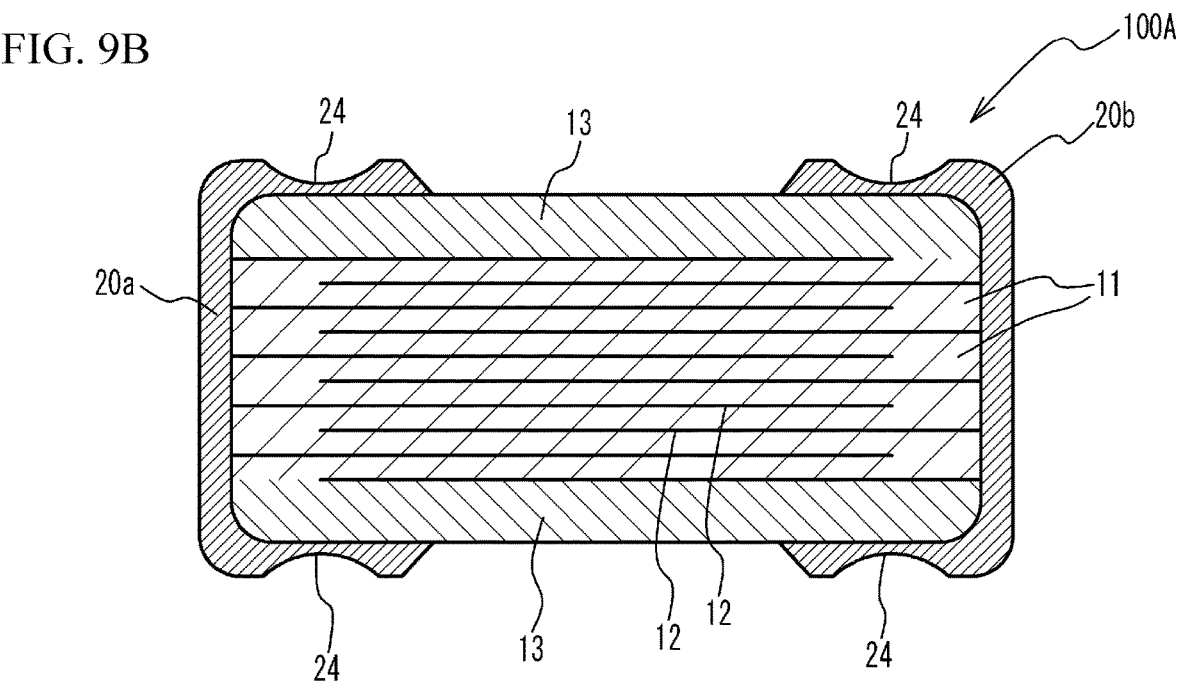
FIG. 9B is a cross-sectional view taken along line C-C in FIG. 8.

FIG. 8 is a partial cross-sectional perspective view of a multilayer ceramic capacitor 100A in accordance with a second embodiment. FIG. 9A is a cross-sectional view taken along line A-A in FIG. 8, and FIG. 9B is a cross-sectional view taken along line C-C in FIG. 8.

The multilayer ceramic capacitor 100A differs from the multilayer ceramic capacitor 100 (see FIG. 1) in that the recessed portion 24 is formed on at least one of the two side faces facing each other in the stack direction (the top face and the bottom face in the stack direction) among four side faces of the multilayer chip 10, and no recessed portion 24 is formed on the remaining two side faces. Note that no recessed portion 24 means that the recess level X described in the first embodiment is less than 25%.

As illustrated in FIG. 9A, in the multilayer ceramic capacitor 100A, each of the two side faces facing each other in the stack direction is formed of the cover layer 13 and the side margin portions 16, while the remaining two side faces are formed of the respective side margin portions 16. Since the recessed portions 24 are formed in the external electrodes 20a and 20b on the side faces (the top face and the bottom face in the stack direction) formed of the side margin portions 16 and the cover layer 13 made of materials having different properties (e.g., different densities), the recessed portions 24 have a desired recess level X. On the other hand, each of the two side faces in the direction perpendicular to the facing direction of the two edge faces and the stack direction of the multilayer chip 10 is formed of the side margin portion 16 having a uniform property. Thus, it is difficult to form the recessed portion 24 having a desired recess level X. Other structures are the same as those of the multilayer ceramic capacitor 100, and the detailed description thereof is thus omitted.

Figure 10:
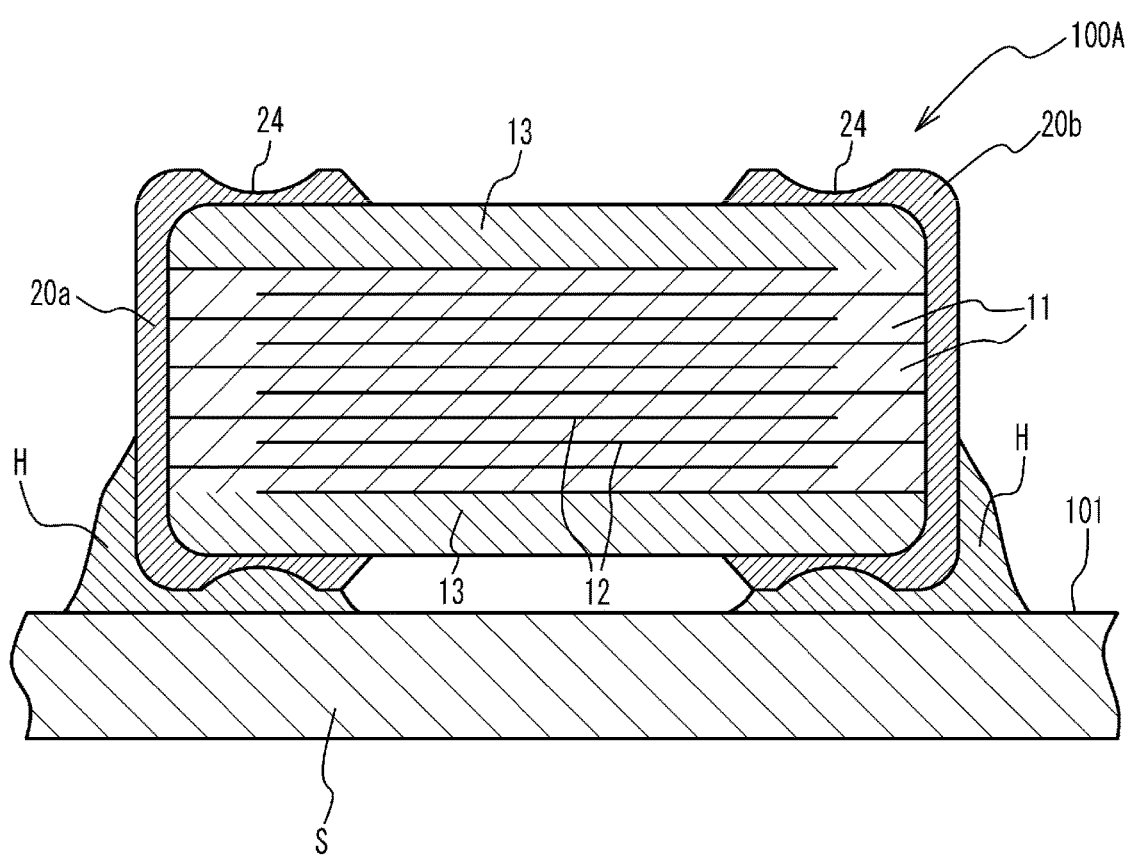
FIG. 10 illustrates a state where the multilayer ceramic capacitor of the second embodiment is mounted on the mounting face of a substrate.

In the multilayer ceramic capacitor 100A of the second embodiment, each of a pair of the external electrodes 20a and 20b formed from the respective edge faces to the four side faces of the multilayer chip 10 has the recessed portion 24 on at least one of the two side faces facing each other in the stack direction or at least one of the remaining two side faces (in the second embodiment, each external electrode 20a, 20b has the recessed portion 24 on at least one of the two side faces facing each other in the stack direction), and has no recessed portion 24 on the two side faces when each external electrode 20a, 20b has the recessed portion 24 on at least one of the remaining two side faces, and has no recessed portion 24 on the remaining two side faces when each external electrode 20a, 20b has the recessed portion 24 on at least one of the two side faces (in the second embodiment, each external electrode 20a, 20b has no recessed portion 24 on the two side faces facing each other in the direction perpendicular to the facing direction of the two edge faces and the stack direction). As illustrated in FIG. 10, the multilayer ceramic capacitor 100A is soldered (mounted) to the mounting surface 101 of the circuit board S with the recessed portion 24 facing the circuit board S. Presence of the recessed portion 24 makes the amount of solder H existing between the multilayer ceramic capacitor 100 and the circuit board S larger than that in the case where no recessed portion 24 is present. Thus, the bond strength between the multilayer ceramic capacitor 100A and the circuit board S is ensured.

In the multilayer ceramic capacitor 100A, the external electrodes 20a and 20b may have recessed portions on the respective edge faces as long as the thickness of each of the external electrodes 20a and 20b at the thinnest part is a predetermined value or greater.

Figure 11:
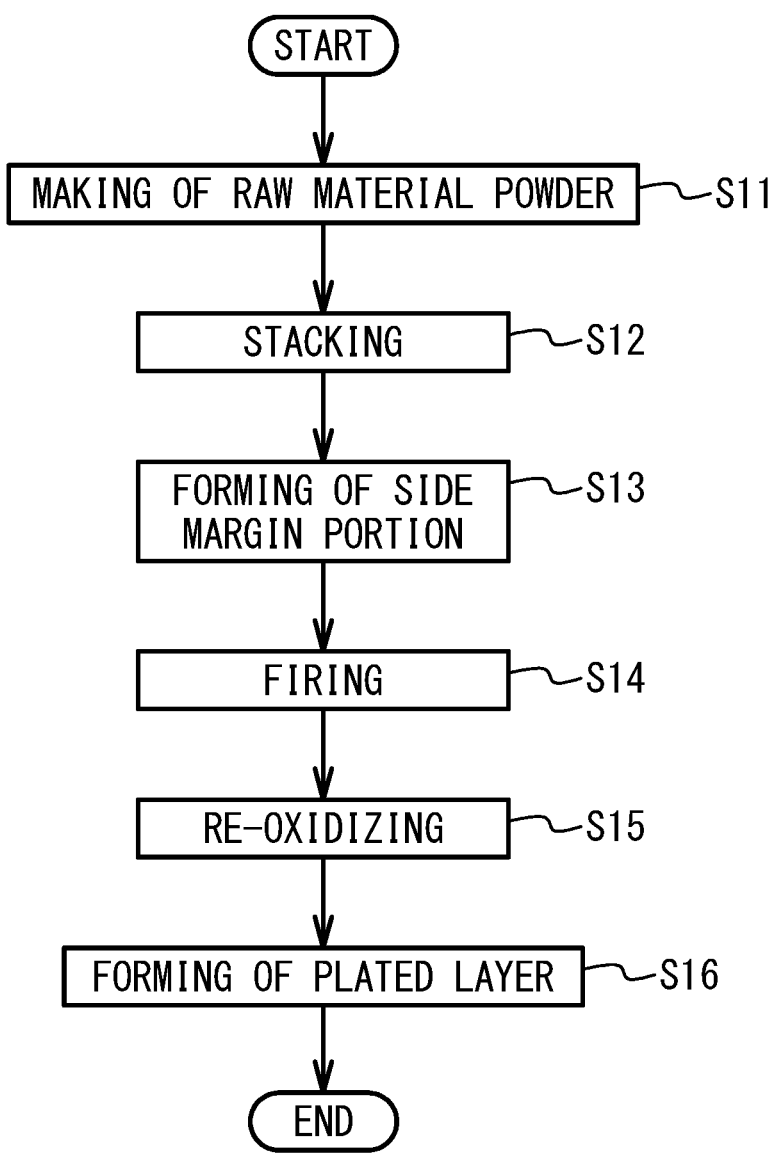
FIG. 11 is a flowchart of a manufacturing method of the multilayer ceramic capacitor of the second embodiment.

Next, a manufacturing method of the multilayer ceramic capacitor 100A in accordance with the second embodiment will be described. FIG. 11 is a flowchart of the manufacturing method of the multilayer ceramic capacitor 100A in accordance with the second embodiment. Hereinafter, only the differences from the manufacturing method of the multilayer ceramic capacitor 100 illustrated in FIG. 6 will be described in detail, and the detailed description of the others will be omitted.

[Making Process of Raw Material Powder (S11)]

A side margin material for forming the side margin portion 16 is prepared in the making process of the raw material powder. Additive compound is added to the ceramic powder of barium titanate obtained through the same process as the making process of the dielectric material for forming the dielectric layer 11, in accordance with purposes. The additive compound may be an oxide of Mn, V, Cr, or a rare-earth element, an oxide of Co, Ni, Li, B, Na, K, or Si, or glass containing Co, Ni, Li, B, Na, K, or Si.

[Stacking Process (S12)]

The pattern of the internal electrode layer 12 is disposed on the surface of the dielectric green sheet by printing the conductive paste for forming the internal electrode layer on the surface of the dielectric green sheet by screen printing, gravure printing, or the like. Then, the dielectric green sheet on which the pattern of the internal electrode layer 12 is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked green sheets and under the stacked green sheets. Thereafter, the resulting multilayer structure is cut into a predetermined size so as to form a multilayer structure having two edge faces to which the patterns of the internal electrode layers 12 are alternately exposed and two side faces to which the patterns of the internal electrode layers 12 are all exposed.

[Forming Process of Side Margin Portion (S13)]

A binder such as polyvinyl butyral (PVB) resin, an organic solvent such as ethanol or toluene, and a plasticizer are added to the side margin material and wet-blended. With use of the resulting slurry, a strip-shaped side margin sheet is coated on a base material using, for example, a die coater method or a doctor blade method, and then dried. The side margin sheet, which is to be the side margin portion 16, is attached to each of the two side faces to which the patterns of the internal electrode layers 12 of the multilayer structure are all exposed. In this case, the side margin sheet having a density less than the density of the cover sheet is used. This allows the recessed portions 24 having a desired recess level X to be formed in the external electrodes 20a and 20b on the side faces formed of the cover sheet and the side margin sheets.

The manufacturing method of the multilayer ceramic capacitor 100A in accordance with the second embodiment illustrated in FIG. 11 enables to manufacture the multilayer ceramic capacitor 100A in which each of the external electrodes 20a and 20b formed from the respective edge faces to the four side faces of the multilayer chip 10 has the recessed portion 24 on at least one of the two side faces facing each other in the stack direction and has no recessed portion 24 on the remaining two side faces (the two side faces facing each other in the direction perpendicular to the facing direction of the two edge faces and the stack direction). The multilayer ceramic capacitor 100A is soldered (mounted) to the mounting surface of a circuit board with the recessed portion 24 facing the circuit board. Presence of the recessed portion 24 makes the amount of solder existing between the multilayer ceramic capacitor 100A and the circuit board larger than that in the case where no recessed portion 24 is present. Thus, the bond strength between the multilayer ceramic capacitor 100A and the circuit board can be ensured. The term "no recessed portion 24 is formed in the metal paste on the side face other than the two side faces facing each other among the four side faces of the ceramic multilayer structure" means that the recessed portion 24 having a recess level X of 25% or greater is not formed in the metal paste.

In addition, in the manufacturing method of the present embodiment, the density of the side margin sheet is less than the density of the cover sheet 13a. This configuration allows the recessed portion 24 having a depth sufficient to ensure the predetermined bond strength to be formed more stably than in the case where the recessed portion 24 is formed by adjusting the amount of the binder in the conductive paste for forming the base conductive layer. Therefore, the bond strength between the multilayer ceramic capacitor 100A and the circuit board is ensured. In addition, since the side margin sheet having a composition different from that of the ceramic green sheet, which is to be the dielectric layer 11, can be used for the side margin portion 16, the degree of freedom of choice in materials for the cover sheet and the side margin sheet is improved.

Figure 12A:
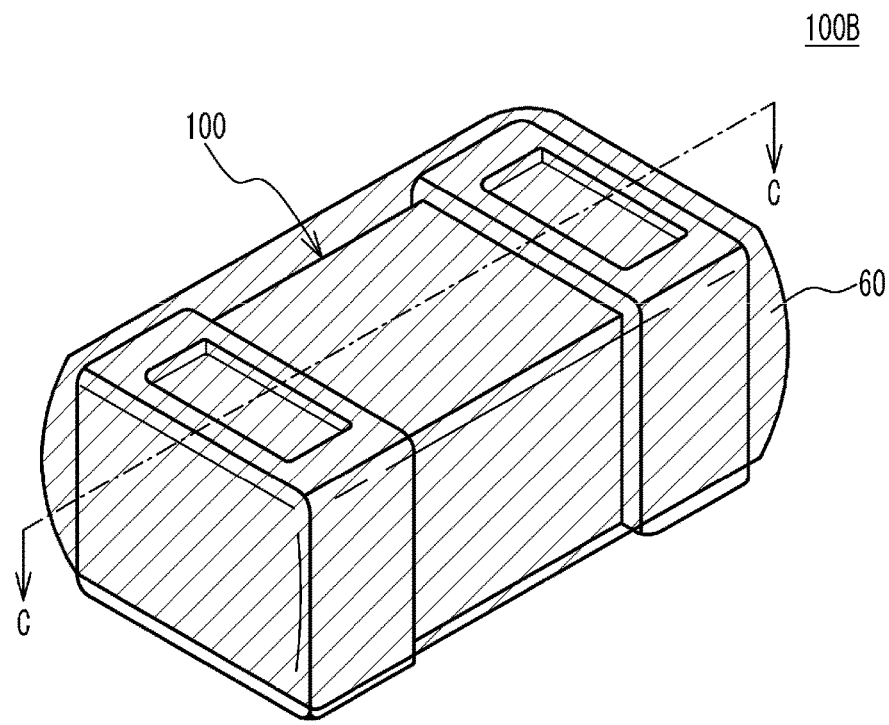
FIG. 12A is a perspective view of a multilayer ceramic capacitor in accordance with a variation.
Figure 12B:
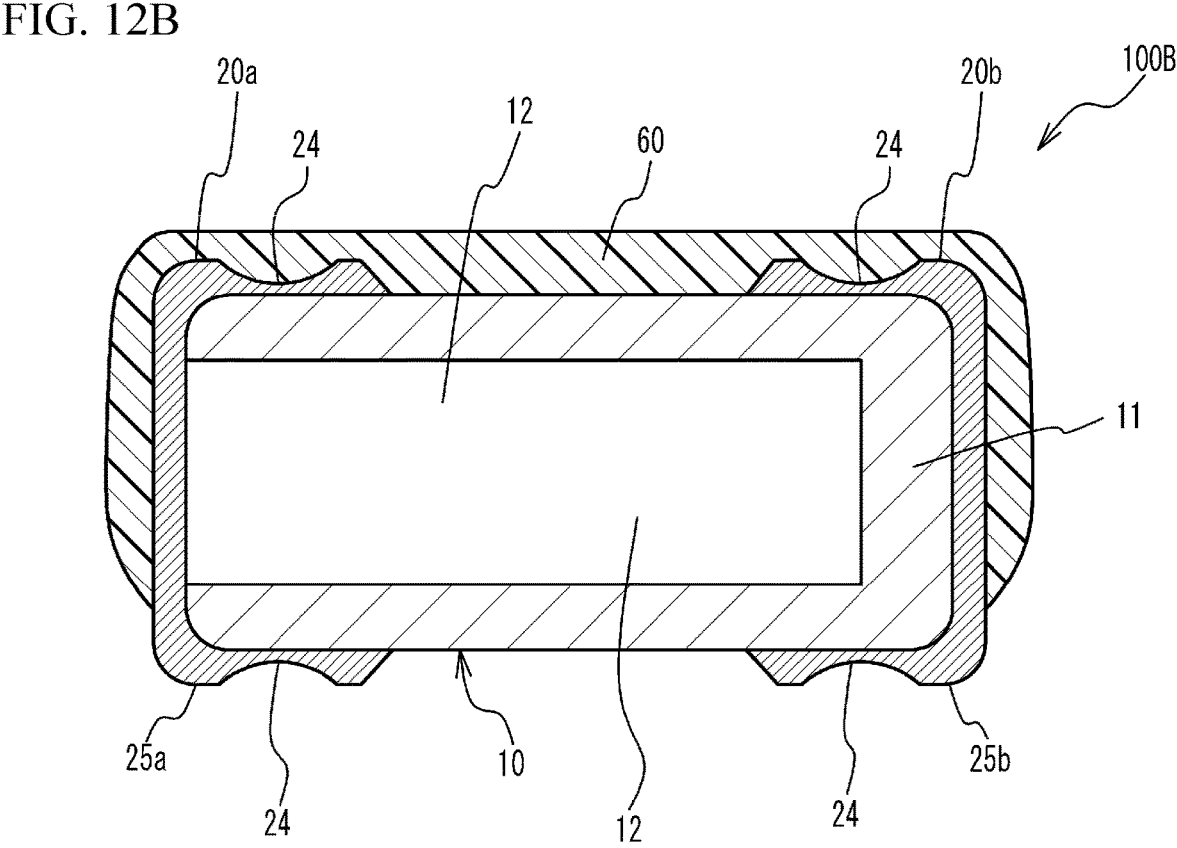
FIG. 12B is a cross-sectional view taken along line C-C in FIG. 12A.

In the manufacturing methods of the first and second embodiments, the recessed portion 24 is formed by adjusting the density of the cover sheet to be less than the density of the dielectric green sheet or adjusting the density of the side margin sheet to be less than the density of the cover sheet. However, this does not intend to suggest any limitation. When it is possible to form the recessed portion 24 before firing the metal paste and the ceramic multilayer structure, the recessed portion 24 may be formed by other methods such as surface processing. Variation FIG. 12A is a perspective view of a multilayer ceramic capacitor 100B in accordance with a variation, and FIG. 12B is a cross-sectional view taken along line C-C in FIG. 12A. The multilayer ceramic capacitor 100B in accordance with the variation includes the multilayer ceramic capacitor 100 and a covering portion 60. The multilayer ceramic capacitor 100A may be used instead of the multilayer ceramic capacitor 100.

The covering portion 60 is made of, for example, resin, and covers five faces excluding one of the two faces each having the recessed portion 24 formed thereon among the six faces of the multilayer ceramic capacitor 100. Thus, the multilayer ceramic capacitor 100B has exposed portions 25a and 25b in which the external electrodes 20a and 20b of the multilayer ceramic capacitor 100 are not covered with the covering portion 60 and are exposed as illustrated in FIG. 12B.

The resin forming the covering portion 60 can be selected from thermosetting resins such as, but not limited to, epoxy resin, polyimide resin, phenol resin, and amino resin, and ultraviolet curable resins such as, but not limited to, radical polymerization resin and cation polymerization resin. In the present variation, it is assumed that the covering portion 60 is formed using thermosetting resin. FIG. 12A illustrates an example where the covering portion 60 is formed of transparent or semi-transparent resin, but the covering portion 60 may be formed of opaque resin or colored resin.

The multilayer ceramic capacitor 100B of the variation includes the covering portion 60 that covers five faces excluding the face on which the recessed portion 24 is formed among the six faces of the multilayer ceramic capacitor 100. Solder cannot wet up to the regions covered with the covering portion 60 in the external electrodes 20a and 20b. Thus, the amount of solder wetting up decreases, and the mounting space is thereby reduced. In addition, there may be concern that the bond strength decreases as the amount of solder wetting up is decreased because of the covering portion 60. However, since the multilayer ceramic capacitor 100B has the recessed portions 24 on the face to be mounted to a circuit board, the amount of solder existing between the multilayer ceramic capacitor 100B and the circuit board is large compared with that in the case where no recessed portion 24 is formed. Thus, the bond strength can be ensured. Furthermore, since five faces excluding the face on which the recessed portion 24 is formed are covered with the covering portion 60, the mounting surface of the multilayer ceramic capacitor 100B to a circuit board can be easily identified.

Figure 13:
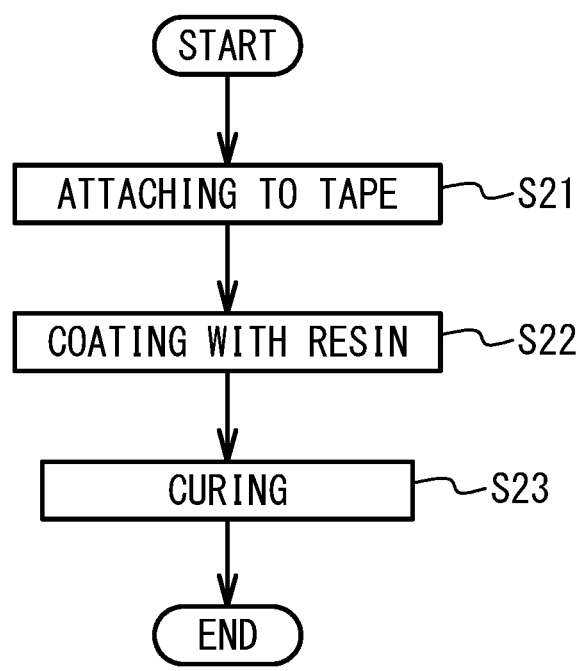
FIG. 13 is a flowchart of a manufacturing method of the multilayer ceramic capacitor of the variation.

Next, a manufacturing method of the multilayer ceramic capacitor 100B in accordance with the variation will be described. FIG. 13 is a flowchart of the manufacturing method of the multilayer ceramic capacitor 100B.

[Process of Attaching to Tape (S21)]

Figure 14A:
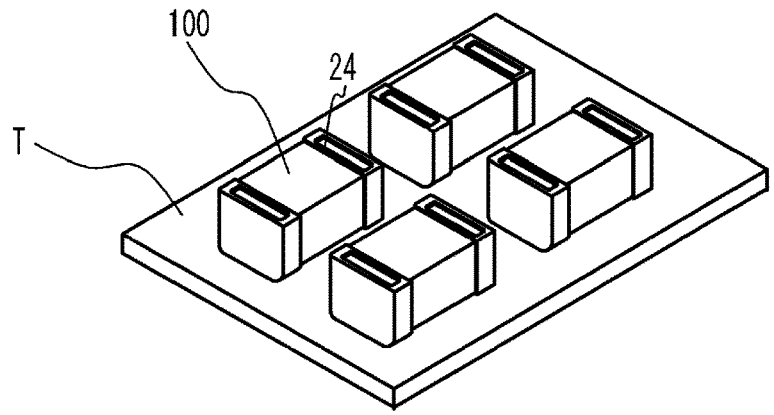
FIG. 14A to FIG. 14D are diagrams for describing the manufacturing method of the multilayer ceramic capacitor of the variation.

As illustrated in FIG. 14A, in the multilayer ceramic capacitor 100 manufactured by any one of the manufacturing methods of FIG. 6 and FIG. 11, one of the two faces on which the recessed portion 24 is formed in each external electrode 20a, 20b is attached to a tape T.

[Process of Coating with Resin (S22)]

Figure 14B:
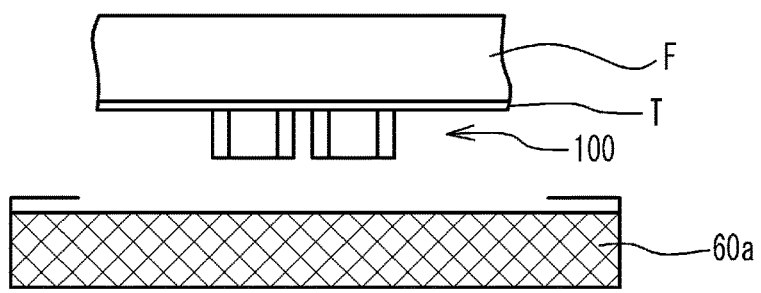
Figure 14C:
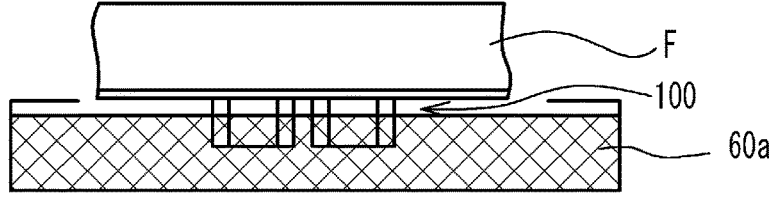
Figure 14D:
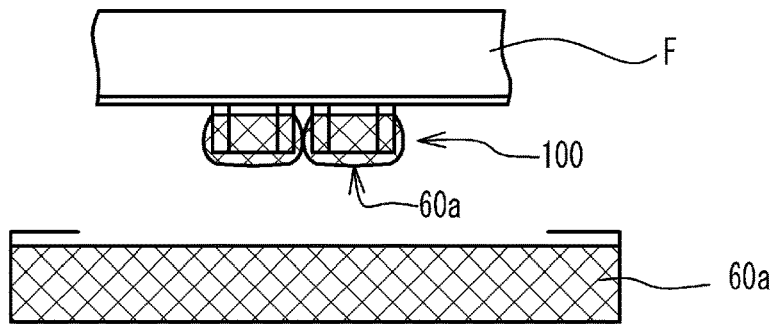

The multilayer ceramic capacitor 100 attached to the tape T is coated with uncured resin 60a. For example, the opposite face of the tape T from the face to which the multilayer ceramic capacitor 100 is attached is fixed to a holding plate F as illustrated in FIG. 14B. The holding plate F is then arranged in a manner such that the multilayer ceramic capacitor 100 faces downward to cause the multilayer ceramic capacitor 100 to face a tub filled with the uncured resin 60a. Then, as illustrated in FIG. 14C, the holding plate F is moved downward to dip the multilayer ceramic capacitor 100 in the uncured resin 60a. At this time, the multilayer ceramic capacitor 100 is dipped in the uncured resin 60a in a manner such that the tape T does not come in contact with the uncured resin 60a. Thereafter, as illustrated in FIG. 14D, the multilayer ceramic capacitor 100 is removed from the uncured resin 60a. Through this process, the uncured resin 60a adheres to the faces of the multilayer ceramic capacitor 100, and the multilayer ceramic capacitor 100 is coated with the uncured resin 60a.

[Curing Process (S23)]

After the uncured resin 60a is temporarily cured, the multilayer ceramic capacitor 100 is peeled from the tape T. Then, the temporary cured resin is completely cured. Through the above process, the multilayer ceramic capacitor 100B of the variation is obtained.

In the embodiments and the variation, the multilayer ceramic capacitor has been described as an example of the ceramic electronic component, but this does not intend to suggest any limitation. For example, the ceramic electronic component may be other electronic components such as a varistor and a thermistor.

EXAMPLES

The multilayer ceramic capacitors in accordance with the embodiment were fabricated, and the variation in the recess level X was examined.

Examples 1 to 3

In examples 1 to 3, the multilayer ceramic capacitor 100 having the recessed portions 24 on the respective two side faces of each of the external electrodes 20a and 20b was fabricated by adjusting the density of the cover sheet to be less than the density of the ceramic dielectric green sheet for forming the side margin portion 16. One hundred multilayer ceramic capacitors 100 of which the designed value of the recess level X was 25, one hundred multilayer ceramic capacitors 100 of which the designed value of the recess level X was 50, and one hundred multilayer ceramic capacitors 100 of which the designed value of the recess level X was 75 were fabricated. Each multilayer ceramic capacitor 100 had a length of 1.0 mm, a width of 0.5 mm, and a height of 0.5 mm.

In comparative examples 1 to 3, the recessed portions 24 are formed on the four side faces of each of the external electrodes 20a and 20b by adjusting the density of the dielectric green sheet to be equal to the density of the cover sheet and varying the amount of the binder in the metal paste for forming the base conductive layer. One hundred multilayer ceramic capacitors 100 of which the designed value of the recess level X was 25, one hundred multilayer ceramic capacitors 100 of which the designed value of the recess level X was 50, and one hundred multilayer ceramic capacitors 100 of which the designed value of the recess level X was 75 were fabricated. In the comparative examples 1 to 3, the recess level X of the recessed portion 24 formed on the top face in the stack direction among the recessed portions 24 formed on the four side faces was measured. This is because the amount of the binder in the metal paste for forming the base conductive layer was varied so that the recess level X of the recessed portion 24 formed on the top face in the stack direction became the designed value.

Figure 15:
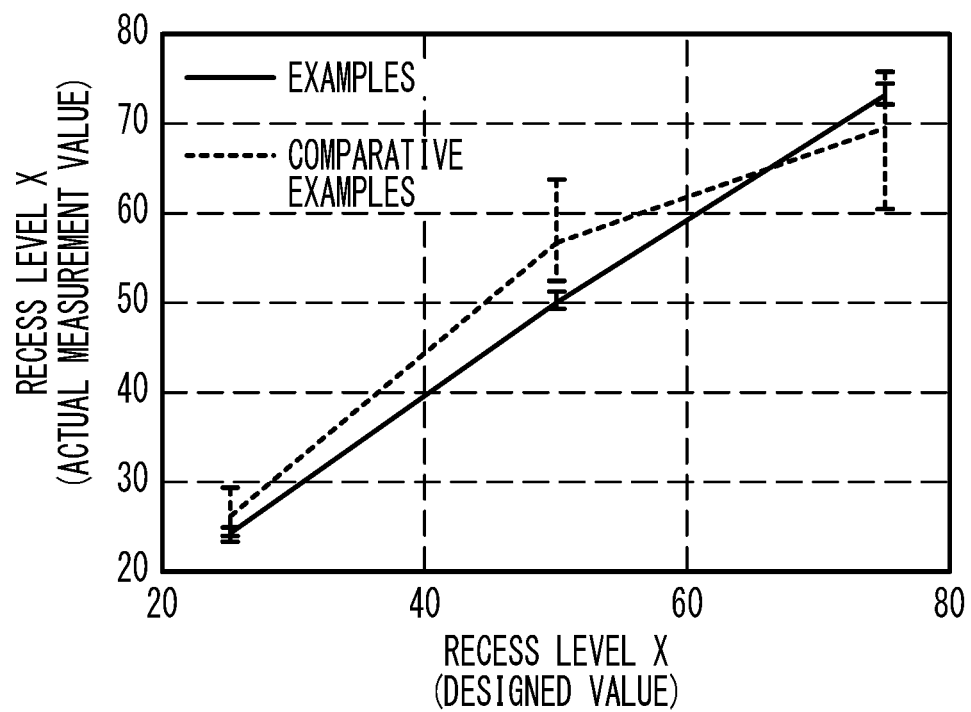
FIG. 15 is a graph of the actual measurement value of the recess level versus the designed value of the recess level in examples and comparative examples.

Table 1 presents the actual measurement value of the recess level X with respect to the designed value of the recess level X. FIG. 15 is a graph of the variation in the actual measurement value of the recess level X versus the designed value of the recess level X.

TABLE 1

| | Actual measurement value of recess level [%] | | |
|---|---|---|---|
| | Average | Smallest value | Largest value |
| Designed value of recess level: 25[%] | | | |
| Example 1 | 24.5 | 23.5 | 25.1 |
| Comparative example 1 | 26.1 | 24.0 | 29.4 |
| Designed value of recess level: 50[%] | | | |
| Example 2 | 50.1 | 49.4 | 51.2 |
| Comparative example 2 | 56.6 | 52.1 | 63.8 |
| Designed value of recess level: 75[%] | | | |
| Example 3 | 73.2 | 72.1 | 74.4 |
| Comparative example 3 | 69.5 | 60.3 | 75.8 |

Table 1 and FIG. 15 reveal that the variation in the recess level X with respect to the designed value is reduced by forming the recessed portion 24 on the two side faces of each of the external electrodes 20a and 20b by adjusting the density of the cover sheet to be less than the density of the side margin portion 16. That is, it was revealed that the recessed portion 24 having a desired recess level X could be stably formed by adjusting the density of the cover sheet to be less than the density of the side margin portion 16. On the other hand, in the comparative examples 1 to 3, the variation in the recess level X with respect to the designed value is large. Therefore, the rejection rate may increase when the recessed portion 24 is formed by varying the amount of the binder in the metal paste for forming the base conductive layer.

Example 4

The multilayer ceramic capacitors 100 having different recess levels X were fabricated by varying the difference between the density of the dielectric green sheet and the density of the cover sheet. The fabricated multilayer ceramic capacitor 100 was soldered to a circuit board in a manner such that the recessed portion 24 faces the circuit board, and the bond strength between the multilayer ceramic capacitor 100 and the circuit board was measured with a push-pull gauge. The multilayer ceramic capacitor 100 had a length of 1.0 mm, a width of 0.5 mm, and a height of 0.5 mm.

Figure 16:
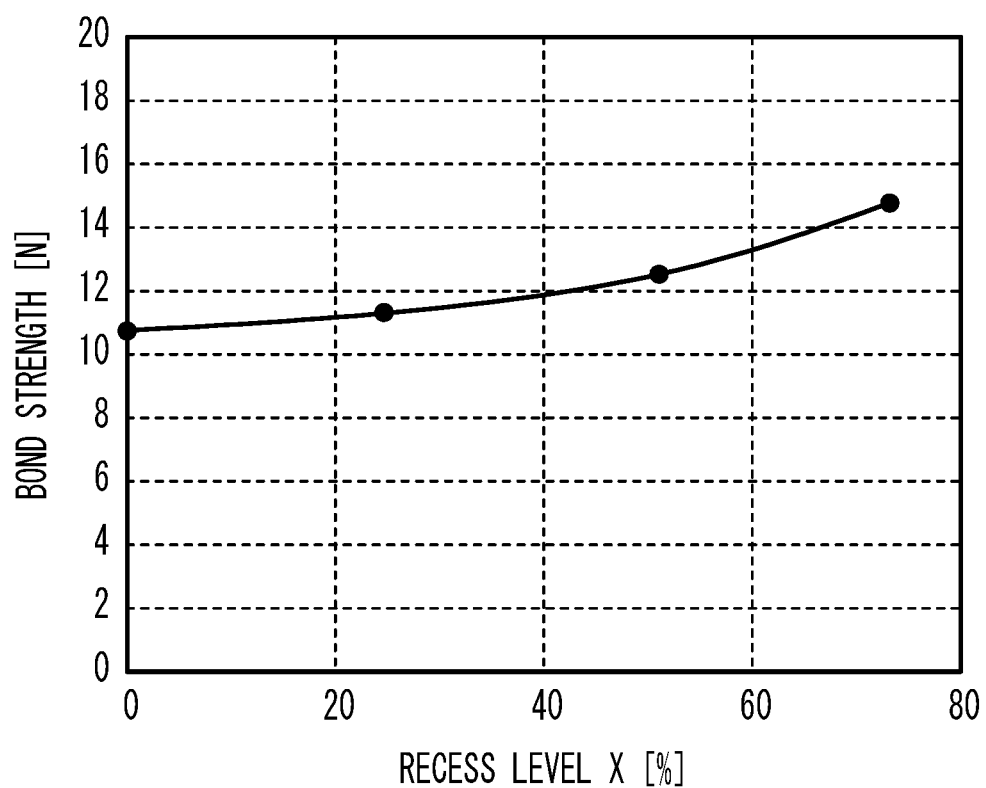
FIG. 16 is a graph of the bond strength versus the recess level X.

FIG. 16 is a graph illustrating the relationship between the recess level X and the bond strength. As presented in FIG. 16, the bond strength increases as the recess level X increases. The bond strength when the recess level X was 25% larger than the bond strength when no recessed portion 24 was formed (the recess level X=0%) by approximately 5%, the bond strength when the recess level X was 50% was larger than the bond strength when no recessed portion 24 was formed by approximately 16%, and the bond strength when the recess level X was 75% was larger than the bond strength when no recessed portion 24 was formed by approximately 37%. It was also revealed that when the recess level X was less than 25%, the recessed portion 24 was ineffective to increase the bond strength.

Examples 5 to 16

Figure 17:
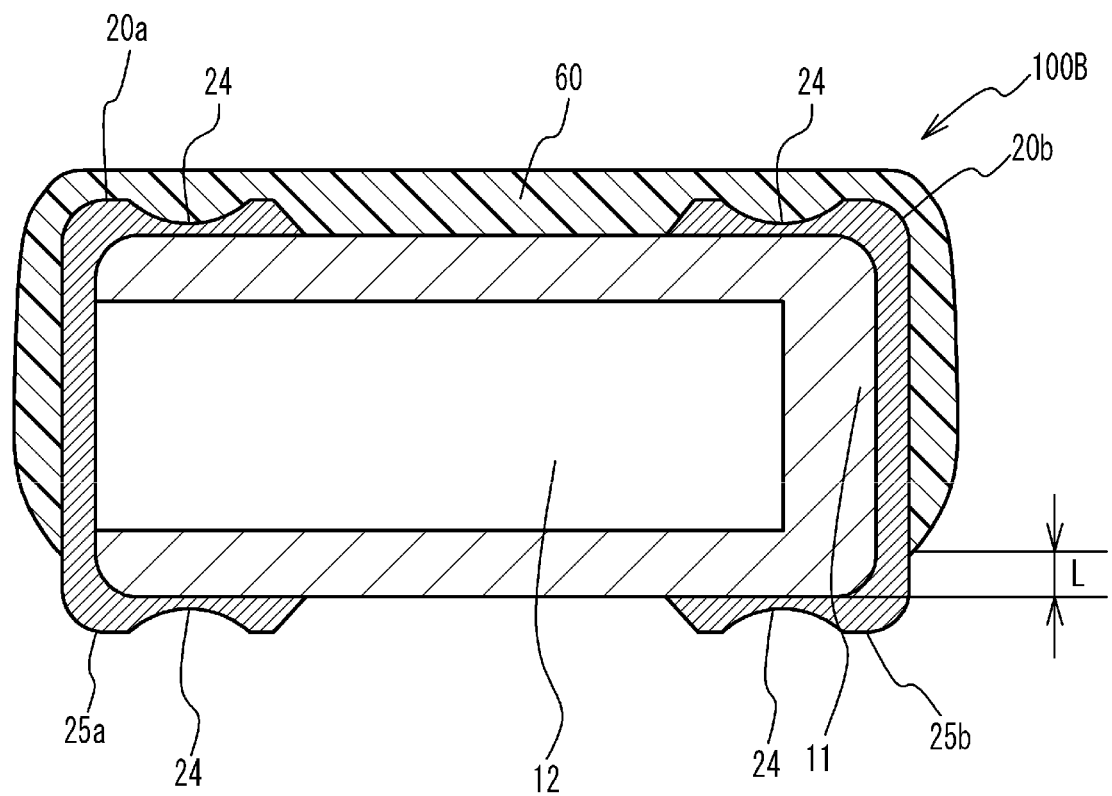
FIG. 17 is a diagram for describing the length of an exposed portion.

The multilayer ceramic capacitors 100B of the variation were fabricated by varying the lengths of the exposed portions 25a and 25b by varying the distance between the surface of the uncured resin 60a and the tape T when the multilayer ceramic capacitor 100 was dipped in the uncured resin 60a illustrated in FIG. 14C. The lengths of the exposed portions 25a and 25b were defined as the distance L from the side face of the multilayer chip 10 to the end of the covering portion 60 as illustrated in FIG. 17.

In examples 5 to 7, the covering portion 60 was formed on each of the multilayer ceramic capacitors 100 having different recess levels X obtained by setting the designed value of the recess level X at 25%, 50%, and 75%, and the lengths of the exposed portions 25a and 25b were adjusted to be 30 μm. In examples 8 to 10, the covering portion 60 was formed on each of the multilayer ceramic capacitors 100 having different recess levels X obtained by setting the designed value of the recess level X at 25%, 50%, and 75%, and the lengths of the exposed portions 25a and 25b were adjusted to be 50 μm. In examples 11 to 13, the covering portion 60 was formed on each of the multilayer ceramic capacitors 100 having different recess levels X obtained by setting the designed value of the recess level X at 25%, 50%, and 75%, and the lengths of the exposed portions 25a and 25b were adjusted to be 100 μm. In examples 14 to 16, the covering portion 60 was formed on each of the multilayer ceramic capacitors 100 having different recess levels X obtained by setting the designed value of the recess level X at 25%, 50%, and 75%, and the lengths of the exposed portions 25a and 25b were adjusted to be 150 μm.

Comparative Example 4 to 7

In comparative examples 4 to 7, no recessed portion 24 was formed. That is, the covering portion 60 was formed on the multilayer ceramic capacitor 100 with a recess level X of 0%, and the lengths of the exposed portions 25a and 25b were adjusted to 30 μm, 50 μm, 100 μm, and 150 μm.

The fabricated multilayer ceramic capacitor 100B was soldered to a circuit board in a manner such that the recessed portion 24 faced the circuit board, and the bond strength between the multilayer ceramic capacitor 100B and the circuit board was measured with a push-pull gauge. Each multilayer ceramic capacitor 100B had a length of 1.0 mm, a width of 0.5 mm, and a height of 0.5 mm.

Figure 18:
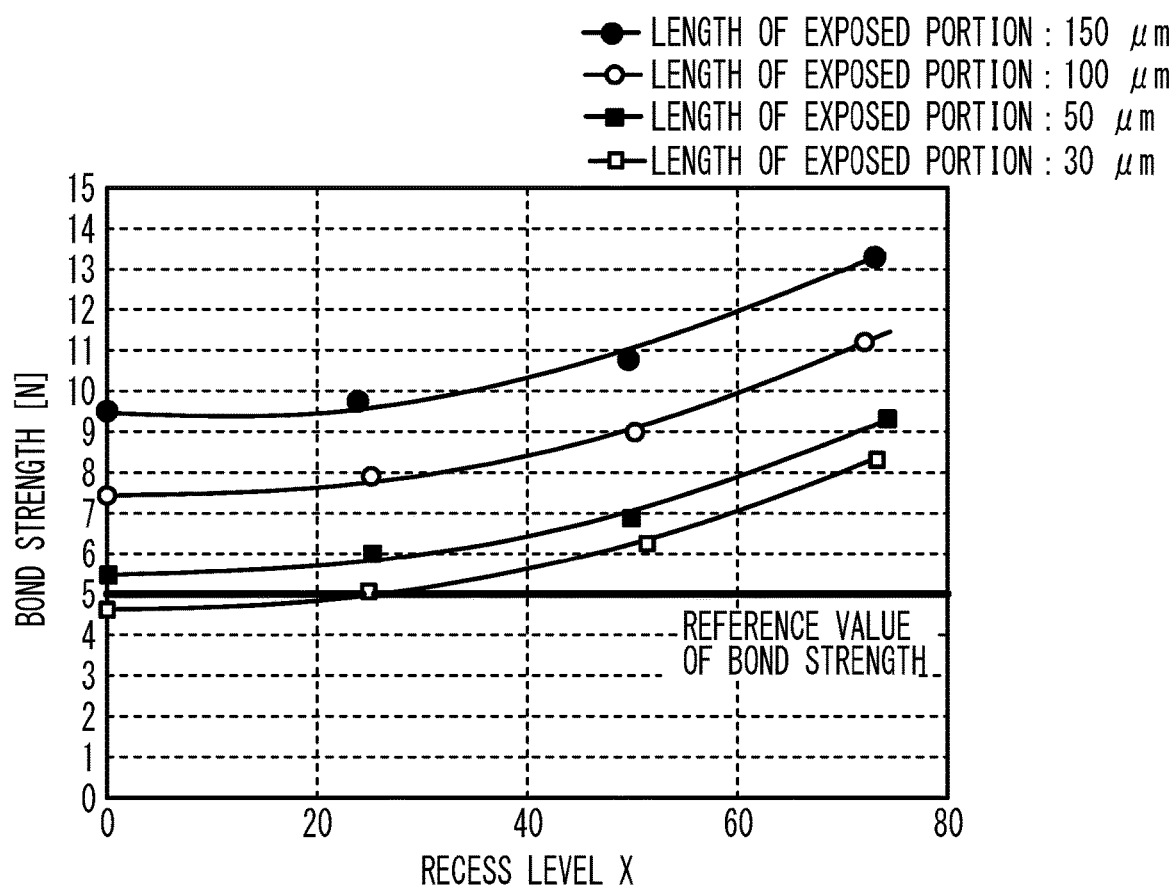
FIG. 18 is a graph illustrating a relationship between the recess level X and the bond strength in the different lengths of the exposed portion.

Table 2 and FIG. 18 present a relationship between the recess level X and the bond strength with respect to the length of the exposed portion.

TABLE 2

|  | Recess level X [%] | Bond strength [N] |
| --- | --- | --- |
| Length of exposed portion: 30 μm | | |
| Comparative example 4 | 0 | 4.7 |
| Example 5 | 24.5 | 5.1 |
| Example 6 | 51.2 | 6.3 |
| Example 7 | 73.2 | 8.4 |
| Length of exposed portion: 50 μm | | |
| Comparative example 5 | 0 | 5.5 |
| Example 8 | 25.1 | 6.1 |
| Example 9 | 49.8 | 6.9 |
| Example 10 | 74.4 | 9.4 |
| Length of exposed portion: 100 μm | | |
| Comparative example 6 | 0 | 7.5 |
| Example 11 | 24.8 | 8 |
| Example 12 | 50.1 | 9 |
| Example 13 | 72.1 | 11.3 |
| Length of exposed portion: 150 μm | | |
| Comparative example 7 | 0 | 9.5 |
| Example 14 | 23.5 | 9.8 |
| Example 15 | 49.4 | 10.8 |
| Example 16 | 73 | 13.4 |

As clear from Table 2 and FIG. 18, the bond strength increases as the recess level X increases. In addition, the bond strength is high when the recess level X is 25% or greater.

When the covering portion 60 is formed on the multilayer ceramic capacitor having no recessed portion 24 and having a small size (particularly, having a low height), the manufacturing yield may be decreased depending on the preciseness of the manufacturing device. Specifically, when the multilayer ceramic capacitor is covered with the covering portion 60 more than as designed and the lengths of the exposed portions 25a and 25b of the manufactured multilayer ceramic capacitor becomes shorter (e.g., less than 50 μm) than the desirable lengths of the exposed portions 25a and 25b with which wetting-up of solder is inhibited and the bond strength with the circuit board is ensured (e.g., 50 to 150 μm), the bond strength between the multilayer ceramic capacitor and the circuit board becomes a reference value or less. Thus, the product of which the lengths of the exposed portions 25a and 25b are less than the lower limit is needed to be treated as a defective product. On the other hand, since the multilayer ceramic capacitor 100B in accordance with the variation has the recessed portion 24, even when the lengths of the exposed portions 25a and 25b become less than the target value, the bond strength can be ensured. Thus, the decrease in yield ratio can be inhibited.

Although the embodiments of the present invention have been described in detail, it is to be understood that the various change, substitutions, and alterations could be made hereto without departing from the spirit and scope of the invention.

What is claimed is:

1. A ceramic electronic component comprising:
a multilayer chip having a substantially rectangular parallelepiped shape and including a multilayer structure and cover layers disposed on a top face and a bottom face in a stack direction of the multilayer structure, the multilayer structure including dielectric layers and internal electrode layers that are alternately stacked, the dielectric layers being mainly composed of ceramic, the internal electrode layers being alternately exposed to two edge faces of the multilayer structure facing each other; and
a pair of external electrodes respectively formed on the two edge faces, each external electrode extending to four side faces of the multilayer chip,
wherein each external electrode has a recessed portion on at least one of two side faces facing each other in the stack direction or at least one of remaining two side faces,
wherein each external electrode has no recessed portion on the two side faces when each external electrode has the recessed portion on at least one of the remaining two side faces, and has no recessed portion on the remaining two side faces when each external electrode has the recessed portion on at least one of the two side faces,
wherein when each external electrode has the recessed portion on at least one of the remaining two side faces, the at least one of the remaining two side faces is not exposed from each external electrode in the recessed portion, and when each external electrode has the recessed portion on at least one of the two side faces, the at least one of the two side faces is not exposed from each external electrode in the recessed portion, and
wherein the recessed portion is located within a region sandwiched between the two edge faces and between the two side faces as viewed from above in a first direction in which the remaining two side faces face each other and is not located outside the region sandwiched between the two edge faces and between the two side faces as viewed from above in the first direction when each external electrode has the recessed portion on at least one of the remaining two side faces, and is located within a region sandwiched between the two edge faces and between the remaining two side faces as viewed from above in a second direction in which the two side faces face each other and is not located outside the region sandwiched between the two edge faces and between the remaining two side faces as viewed from above in the second direction when each external electrode has the recessed portion on at least one of the two side faces.

2. The ceramic electronic component according to claim 1, wherein each external electrode has the recessed portion on at least one of the two side faces facing each other in the stack direction and has no recessed portion on the remaining two side faces.

3. The ceramic electronic component according to claim 1, wherein each external electrode has the recessed portion on at least one of the remaining two side faces and has no recessed portion on the two side faces facing each other in the stack direction.

4. The ceramic electronic component according to claim 1, wherein a recess level X expressed by X=d t is 25% or greater and 75% or less, where t represents a distance between a center of a straight line and a side face of the multilayer chip on which the external electrode has the recessed portion, the straight line connecting a first point with a second point, the first point being a point farthest from the side face of the multilayer chip on which the external electrode has the recessed portion in an outer edge of the recessed portion, the second point being a point closest to the side face of the multilayer chip on which the external electrode has the recessed portion in the outer edge of the recessed portion, and d represents a distance between the center and a point at which the recessed portion is deepest.

5. The ceramic electronic component according to claim 1, wherein a face on which the recessed portion is formed is to be a mounting surface to a circuit board.

6. The ceramic electronic component according to claim 1, further comprising:
   a covering portion covering five faces excluding a face on which the recessed portion is formed among six faces of the ceramic electronic component.

7. A manufacturing method of a ceramic electronic component comprising:
   alternately stacking dielectric green sheets for ceramic dielectric layers and conductive pastes for internal electrode layers so that the internal electrode layers are alternately exposed to two edge faces facing each other and disposing a cover sheet on an uppermost layer and another cover sheet on a lowermost layer so as to form a ceramic multilayer structure having a substantially rectangular parallelepiped shape;
   applying a metal paste on each of the two edge faces of the ceramic multilayer structure in a manner such that the metal paste extends to four side faces of the ceramic multilayer structure;
   forming a recessed portion in the metal paste on at least one of two side faces facing each other in a first direction perpendicular to a second direction and a third direction so that the at least one of the two side faces is not exposed from the metal paste in the recessed portion and the recessed portion is located within a region sandwiched between the two edge faces and between remaining two side faces facing each other in the second direction as viewed from above in the first direction and is not located outside the region sandwiched between the two edge faces and between the remaining two side faces as viewed from above in the first direction, and forming no recessed portion in the metal paste on the remaining two side faces, the second direction being a stack direction of the ceramic multilayer structure, the third direction being a facing direction of the two edge faces; and
   firing the metal paste and the ceramic multilayer structure simultaneously.

8. The manufacturing method according to claim 7, wherein a density of the cover sheet and a density of the another cover sheet are less than a density of the dielectric green sheet.

9. A manufacturing method of a ceramic electronic component comprising:
   alternately stacking dielectric green sheets for ceramic dielectric layers and conductive pastes for internal electrode layers to form a multilayer structure;
   disposing cover sheets respectively on a top face and a bottom face in a stack direction of the multilayer structure;
   forming two edge faces to which the internal electrode layers are alternately exposed and two side faces to which the internal electrode layers are all exposed by cutting the multilayer structure;
   disposing a side margin sheet on each of the two side faces to which all the internal electrode layers are exposed to form a ceramic multilayer structure having a substantially rectangular parallelepiped shape, the conductive pastes for internal electrode layers being alternately exposed to two edge faces facing each other of the ceramic multilayer structure;
   applying a metal paste on each of the two edge faces of the ceramic multilayer structure in a manner such that the metal past extends to four side faces of the ceramic multilayer structure;
   forming a recessed portion in the metal paste on at least one of two side faces facing each other in the stack direction so that the at least one of the two side faces is not exposed from the metal paste in the recessed portion and the recessed portion is located within a region sandwiched between the two edge faces and between side faces other than the two side faces among the four side faces as viewed from above in the stack direction and is not located outside the region sandwiched between the two edge faces and between side faces other than the two side faces as viewed from above in the stack direction, and forming no recessed portion in the metal paste on the side faces other than the two side faces facing each other in the stack direction among the four side faces; and
   firing the metal paste and the ceramic multilayer structure simultaneously.

10. The manufacturing method according to claim 9, wherein a density of the side margin sheet is less than a density of the cover sheet.

* * * * *